United States Patent [19]
Ishidoya et al.

[11] Patent Number: 5,352,740
[45] Date of Patent: Oct. 4, 1994

[54] THERMOSETTING COMPOSITIONS, THERMAL LATENT CARBOXYL COMPOUNDS AND METHODS OF PREPARATION THEREOF

[75] Inventors: Masahiro Ishidoya, Kamakura; Kishio Shibato, Yokohama; Keiji Komoto, Tokyo; Kenji Shibamoto, Yokohama; Mitsuyuki Mashita, Yokohama; Osamu Ohe, Yokohama, all of Japan

[73] Assignee: Nippon Oil and Fats Company, Limited, Tokyo, Japan

[21] Appl. No.: 680,356

[22] Filed: Apr. 4, 1991

[30] Foreign Application Priority Data

| Apr. 10, 1990 | [JP] | Japan | 2-94267 |
| Sep. 28, 1990 | [JP] | Japan | 2-259695 |
| Oct. 26, 1990 | [JP] | Japan | 2-288776 |
| Mar. 28, 1991 | [JP] | Japan | 3-089510 |

[51] Int. Cl.[5] .................. C08L 67/02; C08L 33/02
[52] U.S. Cl. .................. 525/119; 525/124; 525/127; 525/167; 525/175; 525/176; 525/206; 525/208; 525/209; 525/212; 525/217; 525/220; 525/221; 525/223; 525/312; 525/329.5; 525/329.7; 525/437; 525/438; 525/439; 525/440; 525/444
[58] Field of Search ............... 525/208, 223, 221, 206, 525/212, 209, 217, 220, 175, 176, 167, 444, 118, 127, 124, 438, 439, 440, 437, 329.7, 329.5, 312

[56] References Cited

U.S. PATENT DOCUMENTS

| 3,505,297 | 4/1970 | Sheetz et al. |
| 3,679,618 | 7/1972 | Lohr |
| 4,132,686 | 1/1979 | Toyoshima et al. |
| 4,371,667 | 2/1983 | Möller et al. |
| 4,579,937 | 4/1986 | Masuda et al. |
| 4,650,718 | 3/1987 | Simpson et al. |
| 4,681,811 | 7/1987 | Simpson et al. |
| 4,703,101 | 10/1987 | Singer et al. |
| 4,764,430 | 8/1988 | Blackburn et al. |
| 4,769,400 | 9/1988 | Geist ...................... 523/408 |

FOREIGN PATENT DOCUMENTS 672947 10/1963 Canada .
0029595 6/1981 European Pat. Off. .

OTHER PUBLICATIONS

File Supplier PAJ/JPO abstract of JP-A-4081419, Mar. 1992.
Derwent Abstract of JP 4072324, Mar. 1992.
Derwent Abstract of JP 2-115238, Apr. 1990.
Derwent Abstract of JP 1-104646, Apr. 1989.
Derwent Abstract of JP 60-88038, May 1985.
Derwent Abstract of JP 51-114429, Oct. 1976.
Derwent Abstract of JP-A-4080242, Mar. 1992.
Derwent Abstract of JP 4076015, Mar. 1992.
Chemical Abstracts, vol. 109, No. 4, Jul. 25, 1988, Uzawa; A., "Light-stabilized polymer compositions", p. 32, Abstract No. 23 846p.
Chemical Abstracts, vol. 109, No. 4, Jul. 25, 1988, Uzawa; A. "Light-stabilized polymer compositions", p. 32, Abstract No. 23 848r.

*Primary Examiner*—Patricia A. Short
*Attorney, Agent, or Firm*—Frishauf, Holtz, Goodman & Woodward

[57] ABSTRACT

Thermosetting composition is excellent in storage stability, useful as one component thermosetting composition, gives cured products having excellent chemical properties, physical properties and weathering resistance and is favorably utilized in coating compositions, ink, adhesive and molded plastics.

The thermosetting composition comprises a compound having in the molecule two or more carboxyl groups blocked by a vinyl ether compound, a vinyl thioether compound or a hetero compound having a vinyl type double bond and oxygen or sulfur as the hetero atom, a compound having two or more reactive functional groups which can form a chemical bond with the blocked carboxyl compound by heating and optionally a thermal latent acid catalyst. The blocked carboxyl group of the first compound and the reactive functional group of the second compound may be comprised in the same molecule.

24 Claims, No Drawings

THERMOSETTING COMPOSITIONS, THERMAL LATENT CARBOXYL COMPOUNDS AND METHODS OF PREPARATION THEREOF

BACKGROUND OF THE INVENTION

1. Field of the Invention

The present invention relates to novel thermosetting compositions, thermal latent carboxyl compounds and methods of preparation thereof. More particularly, the present invention relates to novel thermosetting compositions having excellent chemical properties, physical properties and weathering resistance and exceptionally excellent storage stability and suitable for preparation of coating compositions, ink, adhesive and molded plastics, novel thermal latent carboxyl compounds utilized for the preparation of the thermosetting compositions and methods of effectively preparing the thermal latent carboxyl compounds.

2. Description of the Prior Art

It is generally known that thermosetting compositions can be prepared from compounds having carboxyl groups and compounds having reactive functional groups which can form chemical bonds with the carboxyl groups by heating, such as epoxy group, silanol group, alkoxysilane group, hydroxyl group, amine group, imino group, isocyanate group, blocked isocyanate group, cyclocarbonate group, vinyl ether group, vinyl thioether group, aminomethylol group, alkylated aminomethylol group, acetal group and ketal group. The thermosetting compositions give cured products having excellent chemical properties, physical properties and weathering resistance and are widely utilized in the field of coating compositions, ink, adhesive and molded plastics.

However, the reactivity between the carboxyl groups and the reactive functional groups is generally very high and compositions in which compounds having carboxyl groups and compounds having the reactive functional groups are mixed together have problems that the composition is often gelatinized during storage or, in other words, that potlife is short.

For the purpose of solving the problems, it was proposed that carboxyl group was blocked by converting it to tertiary butyl ester and the free carboxyl group was regenerated by elimination of isobutene by heating (Laid-Open Japanese Patent Publication Heisei 1-104646). However, this method requires high temperature, such as 170°–200° C., for the heat decomposition of the tertiary-butyl ester and problems remain from tile point of view of material saving and energy saving.

SUMMARY OF THE INVENTION

The present invention accordingly has an object to provide thermosetting compositions which give cured products having excellent chemical properties, physical properties and weathering resistance at relatively low temperature, have excel lent storage stability and can be utilized as one component material. Another object of the invention is Lo provide a thermal latent carboxyl compound useful for the preparation of the thermosetting compositions. Still another object of the invention is to provide methods of preparation of the thermal latent carboxyl compounds.

Thus, the thermosetting compositions of the present invention comprise:

(A) a compound having in the molecule two or more functional groups of tile genera I formula [1]:

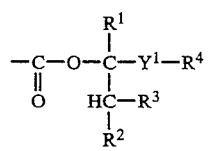

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the heteroatom component;

(B) a compound having in the molecule two or more reactive functional groups which can form a chemical bond with the functional groups of the compound (A) by heating; and, optionally, (C) a thermal latent acid catalyst which is activated during curing of the composition by heating.

The thermosetting composition of the present invention also comprises:

(D) a self-crosslinking compound having in the molecule (a) one or more functional groups of the general formula [2]:

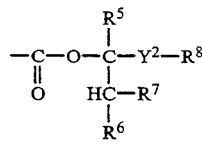

wherein $R^5$, $R^6$ and $R^7$ are respectively selected from the group consisting of a hydrogen atom and an organic group of 1 to 18 carbon atoms, $R^8$ is an organic group of 1 to 18 carbon atoms, $Y^2$ is selected from the group consisting of an oxygen atom and a sulfur atom and $R^7$ and $R^8$ may be bonded with each other to form a heterocyclic structure which comprises $Y^2$ as the heteroatom component; and (b) one or more reactive functional groups which can form a chemical bond with the functional groups (a) by heating;

(C) optionally, a thermal latent acid catalyst which is activated during curing of the composition by heating;

(A) optionally, a compound having in tile molecule two or more functional groups of the general formula [1]:

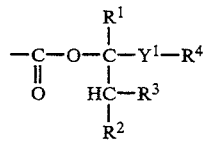

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from tile group consisting of an oxygen atom and a sulfur atom and $R^3$ and $R^4$ may be bonded with each other to form a heterocyclic structure which comprises $Y^1$ as the heteroatom component; and/or, (B) optionally, a compound having in the molecule two or more reactive functional groups which can form a chemical bond by heating with either one or both of the functional group of tire general formula [1] and the functional group of the general formula [2].

The thermal latent carboxyl compounds of the invention are prepared by reaction of a polycarboxyl compound having two or more carboxyl groups in the molecule, acid equivalent of not more than 1000g/mole and number average molecular weight of not more than 4000 with a vinyl ether compound, whereby the carboxyl groups are transformed into a functional group of the general formula [3]:

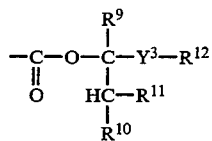

[3]

wherein $R^9$, $R^{10}$ and $R^{11}$ are respectively selected from the group consisting of a hydrogen atom and an organic group of 1 to 18 carbon atoms, $R^{12}$ is an organic group of 1 to 18 carbon atoms. $Y^3$ is selected from the group consisting of an oxygen atom and a sulfur atom and $R^{11}$ and $R^2$ may be bonded with each other to form a heterocyclic structure which comprises $Y^3$ as tile hereto atom component.

The method of preparation of the thermal latent carboxyl compound of the invention is characterized in that a polycarboxyl compound having two or mere carboxyl groups in the molecule, acid equivalent of not more than 1000g/mole and number average molecular weight of not more than 4000 is reacted with a vinyl ether compound.

Other and further objects, features and advantages of the invention will appear more fully from the following description.

DESCRIPTION OF THE PREFERRED EMBODIMENTS

Extensive studies were made by the present inventors to develop a novel thermosetting composition to achieve the objects and i t was discovered that the following compositions were effective.

One of the compositions discovered comprises: (A) a compound having in the molecule two or more carboxyl groups which are blocked by a specific vinyl ether group, vinyl thioether group or heterocyclic group having vinyl type double bond and oxygen or sulfur as the hetero atom component; (B) a compound having in the molecule two or more reactive functional groups which can form chemical bond with the blocked carboxyl group by heating and, optionally, (C) a thermal latent acid catalyst which is activated during curing by heating.

Another of the compositions discovered comprises: (D) a self-crosslinking compound having in the molecule one or more blocked carboxyl groups and one or more reactive functional groups which can form chemical bond with the blocked carboxyl groups by heating and, optionally, the compound (C). The composition may optionally comprise the compound (A) and/or the compound (B).

It was also discovered that the thermal latent carboxyl compound giving the thermosetting composition having the advantageous properties could be prepared by reacting a specific low molecular weight polycarboxyl compound with a vinyl ether compound to block the carboxyl group of the polycarboxyl compound.

The present invention was completed on the basis of the discovery described above.

Thus, the thermosetting compositions of the present invention comprise:

(A) a compound having in the molecule two or more functional groups of the general formula [1]:

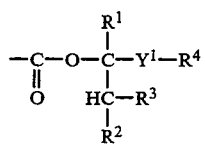

[1]

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to form a heterocyclic structure which comprises $Y^1$ as the hetero atom component;

(B) a compound having in the molecule two or more reactive functional groups which can form a chemical bond with the functional groups of the compound (A) by healing; and, optionally, (C) a thermal latent acid catalyst which is activated during curing of the composition by heating.

The thermosetting compositions of the present invention also comprise:

(D) a self-crosslinking compound having in the molecule (a) one or more functional groups of tile general formula [2]:

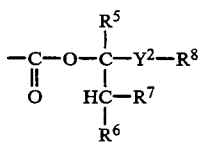

[2]

wherein $R^5$, $R^6$ and $R^7$ are respectively selected from the group consisting of a hydrogen atom and an organic group of 1 to 18 carbon atoms, $R^8$ is an organic group of 1 to 18 carbon atoms, $Y^2$ is selected from the group consisting of an oxygen atom and a sulfur atom and $R^7$ and $R^8$ may be bonded with each other to form a heterocyclic structure which comprises $Y^2$ as the hereto atom component; and (b) one or more reactive functional groups which can form a chemical bond with the functional groups (a) by heating:

(C) optionally, a thermal latent acid catalyst which is activated during curing of the composition by heating;

(A) optionally, a compound having in the molecule two or more functional groups of the general Formula [1]:

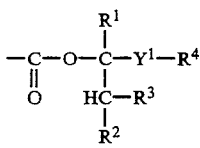

wherein $R^1$, $R^2$ and $R^3$ are respectively selected from the group consisting of a hydrogen atom and an organic group of 1 to 18 carbon atoms, $R^4$ is an organic group of 1 to 18 carbon atoms, $Y^1$ is selected from the group consisting of an oxygen atom and a sulfur atom and $R^3$ and $R^4$ may be bonded with each other to Form a heterocyclic structure which comprises $Y^1$ as the hereto atom component; and/or, (B) optionally, a compound having in the molecule two or more reactive functional groups which can form a chemical bond by heating with either one or both of the functional group having tile general formula [1] and the functional group having the general formula [2].

The thermal latent carboxyl compound of the invention is prepared by reaction of a polycarboxyl compound having two or more carboxyl groups in the molecule, acid equivalent of not more than 1000g/mole and number average molecular weight of not more than 4000 with a vinyl ether compound, whereby the carboxyl group i s transformed into a functional group having the general formula [3]:

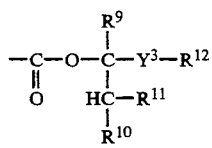

wherein $R^9$, $R^{10}$ and $R^{11}$ are respectively selected from the group consisting of a hydrogen atom and an organic group of 1 to 18 carbon atoms, $R^{12}$ is an organic group of 1 to 18 carbon atoms, $Y^3$ is selected from the group consisting of an oxygen atom and a sulfur atom and $R^{11}$ and $R^{12}$ may be bonded with each other to form a heterocyclic structure which comprises $Y^3$ as the hetero atom component.

The method of preparation of the thermal latent carboxyl compound of the invention is characterized in that a polycarboxyl compound having two or more carboxyl groups in the molecule, acid equivalent of not more than 1000g/mole and number average molecular weight of not more than 4000 is reacted with a vinyl ether compound.

The invention is described in more detail in the following.

The compound (A) in the thermosetting composition of the invention has in the molecule two or more, preferably from 2 to 50, functional groups of the following general formula [1]:

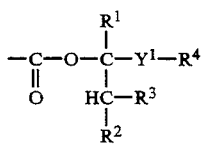

The functional group having the general formula [1] is easily prepared by reaction of carboxyl group with a vinyl ether, a vinyl thioether or a heterocyclic compound having oxygen or sulfur as the hereto atom and having a vinyl type double bond which is described by the general formula [4]:

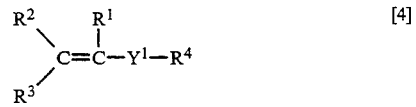

In the formula [1] and formula [4], $R^1$, $R^2$ and $R^3$ are respectively selected from the group consisting of a hydrogen atom and an organic group, such as alkyl group, aryl group and alkaryl group of 1 to 18 carbon atoms, $R^4$ is an organic group, such as alkyl group, aryl group and alkaryl group of 1 to 18 carbon atoms. The organic groups may have substituted groups in the molecule and $R^3$ and $R^4$ may, by bonding together, form a heterocyclic structure with or without substituents and having $Y^1$ as the hereto atom component.

Examples of the compound of the formula [4] are: aliphatic vinyl ethers, such as methyl vinyl ether, ethyl vinyl ether, isopropyl vinyl other, n-propyl vinyl ether, n-butyl vinyl ether, isobutyl vinyl ether, 2-ethylhexyl vinyl ether, cyclohexyl vinyl ether and the like; aliphatic vinyl thioethers, such as methyl vinyl thioether, ethyl vinyl thioether, isopropyl vinyl thioether, n-propyl vinyl thioether, n-butyl vinyl thioether, isobutyl vinyl thioether, 2-ethylhexyl vinyl thioether, cyclohexyl vinyl thioether and the like; cyclic vinyl ethers, such as 2,3-dihydrofuran, 3,4-dihydrofuran, 2,3-dihydro-2H-pyran, 3,4-dihydro-2H-pyran, 3,4-dihydro-2-methoxy-2H-pyran, 3, 4-dihydro-4,4-dimethyl-2H-pyran-2-one, 3,4-dihydro-2-ethoxy-2H-pyran, sodium 3,4-dihydro-2H-pyran-2-carboxylate and the like; and cyclic vinyl thioethers, such as 2,3-dihydrothiophene, 3,4-dihydrothiophene, 2,3-dihydro-2H-thiopyran, 3,4-dihydro-2H-thiopyran, 3,4-dihydro-2-methoxy-2H-thiopyran, 3,4-dihydro-4,4-dimethyl -2H-thiopyran-2-one, 3,4-dihydro-2-ethoxy-2H-thiopyran, sodium 3,4-dihydro-2H-thiopyran-2-carboxylate and the like.

The compound (A) is prepared by the reaction of a compound having two or more carboxyl groups in the molecule with the compound having the formula [4]. Examples of the compound having two or more carboxyl groups in the molecule are: aliphatic polycarboxylic acids of 2 to 22 carbon atoms, such as succinic acid, adipic acid, azelaic acid, sebacic acid, decamethylenedicarboxyl ic acid and the like; aromatic polycarboxyl ic acids, such as phthalic acid, isophthal ic acid. terephthal ic acid, trimellitic acid, pyromellitic acid and the like; alicyclic polycarboxylic acids, such as tetrahydrophthalic acid, hexahydrophthalic acid and the like; resins having two or more carboxyl groups in tile molecule, such as polyester resins, acrylic resins, polybutadiene resins modified with maleic acid and the like resins all having two or more carboxyl groups in the molecule.

The compound having two or more carboxyl groups in the molecule is prepared by: (i) half-esterification of a polyol having two or more hydroxyl groups in the molecule with an acid anhydride; (2) addition of a polyisocyanate compound having two or more isocyanate groups in the molecule with a hydroxycarboxylic acid or an amino acid; (3) polymerization of an $\alpha,\beta$- unsaturated monomer having carboxyl group or copolymerization of the α,β-unsaturated monomer with other α,β-unsaturated monomers; (4) preparation of polyester resin having carboxyl groups and the like other methods.

Examples of the polyol having two or more hydroxyl groups are: ethylene glycol, 1,2-propylene glycol, 1,3-propylene glycol, 1,3 butanediol, 1,4-butanediol, 2,3-butanediol, 1,6-hexanediol, diethylene glycol, pentanediol, dimethylbutanediol, hydrogenated bisphenol A, glycerol, sorbitol, neopentyl glycol, 1,8-octanediol, 1,4-cyclohexanedimethanol, 2-methyl-1,3-propanediol, 1,2,6-hexanetriol, 1,2,4-butanetriol, trimethylolethane, trimethylolpropane, pentaerythritol, quinitol, mannitol, tris-hydroxyethyl isocyanurate, dipentaerythritol and the like; addition products of the polyhydric alcohol with a lactone, such as γ-butyrolactone and ε-caprolactone and the like, by ring opening of the lactone; addition products of the polyhydric alcohol with an isocyanate, such as tolylene diisocyanate, diphenylmethane diisocyanate, hexamethylene diisocyanate, isophorone diisocyanate and the like, in excess amount of the alcohol; addition products of the polyol with a divinyl ether, such as ethylene glycol divinyl ether, polyethylene glycol divinyl ether, butanediol divinyl ether, pentanediol divinyl ether, hexanediol divinyl ether, 1,4-cyclohexane-dimethanol divinyl ether and the like, in excess amount of the alcohol; addition products of the polyol with an alkoxysilane compound, such as KR-213 ®, KR-217 ®, KR-9218 ® (products of Shinetsu Chemical Co., Ltd.), in excess amount of the alcohol; and the like other compounds.

Examples of the acid anhydride which reacts with the polyol having two or more hydroxyl groups in the molecule are: acid anhydrides of polycarboxylic acids, such as succinic acid, glutaric acid, adipic acid azelaic acid, sebacinic acid, glutaric acid, adipic acid, azelaic acid, sebacinic acid, decamethylenedicarboxylic acid, phthalic acid, maleic acid, trimellitic acid, pyromellitic acid, tetrahydrophthalic acid, hexahydrophthalic acid and the like.

Examples of the polyisocyanate compound having two or more isocyanate groups in the molecule which reacts with a hydroxycarboxylic acid or an amino acid are: p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane-1,6-diisocyanate, methylene-bis-(phenylisocyanate), lysine methyl ester diisocyanate, bis-(isocyanatoethyl) fumarate, isophorone diisocyanate, methylcyclohexyl diisocyanate, 2-isocyanatoethyl-2,6-diisocyanatohexanoate, biuret derivatives of these polyisocyanates, isocyanurate derivatives of these polyisocyanates and the like compounds.

Examples of the hydroxycarboxylic acid which reacts with the polyisocyanate compound are: lactic acid, citric acid, hydroxypivalic acid, 12- hydroxystearic acid, malic acid and the like. Examples of the amine acid which reacts with the polyisocyanate compound are: DL-alanine, L-glutamic acid, glycine, L-teanine, glycylglycine, γ-aminocaproic acid, L-aspartic acid, L-citrulline, L-arginine, L-leucine, L-serine and the like.

Examples of the α,β-unsaturated monomer having carboxyl group which are polymerized or copolymerized are: acrylic acid, methacryl ic acid, itaconic acid, mesaconic acid, maleic acid, fumaric acid and the like. Examples of the other α,β-unsaturated monomer which is copolymerized with the α,β-unsaturated monomer having carboxyl group are: methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, cyclohexyl (meth)acrylate, 2-ethylhexyl α-(meth)acrylate, stearyl (meth)acrylate, styrene, methylstyrene, p-vinyltoluene, acrylonitrile and the like.

The polyester resin having carboxyl groups is easily prepared according to the conventional method of preparation of polyester resins by using excess amount of polyacid in relation to the amount of polyol.

The reaction of the compound having two or more, preferably from 2 to 50, carboxyl group in the molecule with the compound having the formula [4] is generally performed at a temperature between the ambient temperature and 100° C. in the presence of an acid catalyst.

Either a single kind of the compound (A) or a combination of two or more kinds of the compound (A) may be utilized in the invention.

The compounds (B) utilized in the thermosetting composition of the invention are compounds having in the molecule two or more, preferably from 2 to 50, reactive functional groups which can form chemical bonds by the reaction with the regenerated carboxyl group formed from the blocked carboxyl group [1] of the compound (A) by heating. The kind of the reactive functional group is not particularly limited so long as it satisfies the condition described herein. Preferable examples of the reactive functional group are: epoxy group, silanol group, alkoxysilane group, hydroxyl group, amino group, imino group, isocyanate group, blocked isocyanate group, cyclocarbonate group, vinyl ether group, vinyl thioether group, aminomethylol group, alkyl substituted aminomethylol group, acetal group, ketal group and the like groups. The compound (B) may have either a single kind or two or more kinds of the reactive functional groups in tile molecule.

Examples of the compound of (B) are: compounds having epoxy groups, such as epoxy resins of bisphenol type, alicyclic epoxy resins, homopolymers and copolymers of glycidyl (meth)acrylate, 3,4-epoxycyclohexylmethyl (meth)acrylate and the like compounds, polyglycidyl compounds obtained by the reaction of epichlorohydrine with polycarboxylic acids or polyols and other like compounds; compounds having silanol group or alkoxysilane group, such as condensation products of a compound having the formula [5]:

$$(R^{13})_n Si(OR^{14})_{4-n} \qquad [5]$$

wherein
R$^{13}$ and R$^{14}$ are respectively selected from the group consisting of alkyl group of 1 to 18 carbon atoms and aryl group of 1 to 18 carbon atoms and n is 0, 1 or 2, homopolymers and copolymers of α,β-unsaturated silane compounds, like acryloyloxypropyltrimethoxysilane, methacryloyloxypropyltrimethoxysilane, methacryoyloxypropyltri-n-butoxysilane and the like, hydrolysis products of these compounds and the like;

compounds having hydroxyl group, such as aliphatic polyols, phenols, polyalkyleneoxyglycols, homopolymers and copolymers of α,β-unsaturated compounds, like 2-hydroxyethyl-(meth)acrylates, 2-hydroxypropyl (meth)acrylate and the like, addition products of ε-caprolactone with these polyhydroxyl compounds and the like;

compounds having amino group, such as aliphatic diamino compounds, aromatic diamino compounds, polyamino compounds prepared by cyanoethylation and reduction of the compounds having hydroxyl group and the like;

compounds having imino group, such as aliphatic polyimino compounds, aromatic polyimino compounds and the like;

compounds having isocyanate group, such as p-phenylene diisocyanate, biphenyl diisocyanate, tolylene diisocyanate, 3,3'-dimethyl-4,4'-biphenylene diisocyanate, 1,4-tetramethylene diisocyanate, hexamethylene diisocyanate, 2,2,4-trimethylhexane 1,6-diisocyanate, methylene-bis-(phenyl isocyanate), lysine methyl ester diisocyanate, bis-(isocyanatoethyl) fumarate, isophorone diisocyanate, methylcylcohexyl diisocyanate, 2-isocyanatoethyl 2,6-diisocyanatohexanoate, biuret derivatives and isocyanurate derivatives of these isocyanates, addition products of these isocyanates and the compounds having hydroxyl group and the like;

compounds having blocked isocyanate group, such as compounds prepared by blocking the compounds having isocyanate group with phenols, lactams, active methylenes, alcohols, acid amides, imides, amines, imidazoles, ureas, imines, or oximes and the like compounds;

compounds having cyclocarbonate group, such as homopolymers and copolymers of 3-(meth)acryloyloxypropylene carbonate, compounds having polyfunctional cyclocarbonate groups prepared by tile reaction of the compounds having epoxy group with carbon dioxide and the like;

compounds having vinyl ether group or vinyl thioether group, such as polyfunctional vinyl ether compounds prepared by the reaction of vinyl compounds having hydroxyl group with halogenated alkyl vinyl ethers, polyvinyl ethers prepared by the reaction of hydroxyalkyl vinyl ethers with compounds having polyfunctional carboxyl group or with the compounds having isocyanate group, copolymer of vinyloxyalkyl (meth)acrylates with $\alpha,\beta$-unsaturated compounds, vinyl thioethers corresponding to the vinyl ethers and the like;

compounds having aminomethylol groups or alkyl substituted aminomethylol groups, such as melamine formaldehyde resins, glycolyl formaldehyde resins, urea formaldehyde resins, homopolymers and copolymers of $\alpha,\beta$-unsaturated compounds having aminomethylol group or alkylated aminomethylol group and the like;

compounds having acetal groups or ketal groups, such as polyfunctional acetal compounds prepared by the reaction of polyfunctional ketones, polyfunctional aldehydes, or polyfunctional vinyl ether compounds and the like compounds with alcohols or orthoacids esters, condensation products of the polyfunctional acetal compounds with polyols, homopolymers and copolymers of addition products of the vinyloxyalkyl (meth)acrylate with alcohols or orthoacid esters; and the like other compounds.

The compound (B) utilized in the invention may be either a compound comprising a single kind of functional group, such as the compounds shown in the examples, or a compound comprising two or more kinds of functional group in the molecule. Two or more kinds of the compound (B) may utilized together. However, when the functional groups of two or more kinds are reactive between each other, the storage stability of the thermosetting composition is damaged and the utilization of such combination of the functional groups is undesirable. Examples of such undesirable combination of functional groups are: combination of a functional group selected from the group of epoxy group, isocyanate group, vinyl ether group, vinyl thioether group, cyclocarbonate group and silanol group with amino group or imino group, combination of hydroxyl group with isocyanate group or vinyl ether group and the like other combinations.

The thermosetting composition of the invention may comprise the compound (A) and the compound (B) or it may comprise compound (D), a self-crosslinking compound comprising (a) one or more, preferably from one to 50, functional groups having tile formula [2] and (b) one or more, preferably from one to 50, reactive functional groups which can form chemical bond with the functional group (a) by heating. The thermosetting composition of the invention may also comprise the compound (D) and the compound (A) and/or the compound (B) and, in this case, the functional group of the compound (B) forms chemical bond with the functional group of formula [1] and/or the functional group of formula [2] by heating.

Examples of the functional group (a) having the formula [2] of the compound (D) are the same functional groups as the examples of the functional group having the formula [1] in the compound (A) already described. Examples of the reactive functional group (b) are the same functional groups as the examples of the reactive functional groups of compound (B).

The compound (D) can be prepared from a compound comprising one or more carboxyl groups and one or more reactive functional groups in the molecule by using the same reaction as the reaction utilized in the preparation of the compound (A). The compound (D) can also be prepared by copolymerization of an unsaturated compound having the functional group of formula [2] with an unsaturated compound having tile reactive functional group.

The compound (D) comprises the functional group of formula [2] and, furthermore, may comprise two or more kinds of in the reactive functional groups the same molecule. However, when the two or more kinds of the functional groups are reactive between each other, the storage stability of the thermosetting composition is damaged and the utilization of such combination of the functional groups is not desirable.

In the thermosetting composition of the invention, it is preferable that at least one of the compounds (A) and/or the compound (B) or at least one of the compound (D) and the compound (A) and/or tile compound (B) which are utilized optionally is polymer of $\alpha,\beta$-unsaturated compound or polyester resin. It is also preferable that equivalent ratio of the functional group of formula [1] or formula [2] and the reactive functional group to form chemical bond with the former functional group by heating utilized in the thermosetting composition is adjusted in the range from 0.2:1.0 to 1.0:0.2.

The functional groups of formulas [1], [2] and [3] of the compound (A) and the compound (D) regenerate free carboxyl group under the heating condition and form chemical bonding with the reactive functional groups in the compound (g) and the compound (D). It is also possible that the functional groups have addition reactions with the reactive functional groups of the compound (B) and the compound (D) by acting as an active ester caused by the polarized structure within the molecule. When the reaction of this kind takes place, the crosslinking reaction is not accompanied with any component leaving from the reacting system and the reaction system can contribute to the decrease of formation of volatile organic compounds.

In the present invent ion, a thermal latent acid catalyst (C) which shows activity in the curing condition at an elevated temperature may be optionally comprised in the thermosetting composition for the purpose of keeping excellent storage stability of the composition for a long period of time, promoting the curing reaction when the composition is cured in a short time at a rather low temperature and giving excellent chemical properties and physical properties to the cured is products. It is preferable that the thermal latent acid catalyst is a compound which exhibit the activity at the temperature above 60° C. If the thermal latent acid catalyst shows the catalytic activity under 60° C., the prepared thermosetting composition has undesirable properties, such as increase of viscosity during storage and formation of gel.

Preferred examples of the thermal latent acid catalyst are compounds prepared by neutralizing a protonic acid with a Lewis base, compounds prepared by neutralizing a Lewis acid with a Lewis base or by mixing Lewis acid with trialkyl phosphate, esters of sulfonic acids, esters of phosphoric acids and onium compounds.

Examples of the compound prepared by neutralizing a protonic acid with a Lewis base are: compounds prepared by neutralizing halogenocarboxylic acids, sulfonic acids, monoesters of sulfuric acid, monoesters of phosphoric acid, diesters of phosphoric acid, esters of polyphosphoric acid, monoesters of boric acid, diesters of boric acid and the like compounds with ammonia, monoethylamine, triethylamine, pyridine, piperidine, aniline, morpholine, cyclohexylamine, n-butylamine, monoethanolamine, diethanolamine, triethanolamine and the like other amine compounds, trialkylphosphine, triarylphosphine, trialkyl phosphite, triaryl phosphite, commercial acid-base blocked catalysts, such as Nacure 2500X®, X-47-110®, 3525® and 5225® (products of King Industries Co., Ltd.) and other like compounds.

Examples of the compounds prepared by neutralizing a Lewis acid with a Lewis base are compounds prepared by neutralizing $BF_3$, $FeCl_3$, $SnCl_4$, $AlCl_3$, $ZnCl_2$ and other like Lewis acids with bases described above or by mixing Lewis acid with trialkyl phosphate.

The esters of sulfonic acids are compounds having the formula [6]:

$$R^{15}-\overset{\overset{O}{\|}}{\underset{\underset{O}{\|}}{S}}-O-R^{16} \quad [6]$$

wherein $R^{15}$ is selected from the group consisting of phenyl group, substituted phenyl group, naphthyl group, substituted naphthyl group and alkyl group and $R^{16}$ is a group of 3 to 18 carbon atoms selected from the group consisting of alkyl group, alkenyl group, aryl group, alkaryl group, alkanol group and saturated or unsaturated cycloalkyl or hydrocycloalkyl group which is bonded with sulfonyloxy group through a primary or secondary carbon atom. Examples of the ester of sulfonic acid are esters of a sulfonic acid, such as methane sulfonic acid, ethane sulfonic acid, benzene sulfonic acid, dodecylbenzene sulfonic acid, naphthalene sulfonic acid, nonylnaphthalene sulfonic acid and other like sulfonic acids, with a primary alcohol, such as n-propanol, n-butanol, n-hexanol, n-octanol and the like, or a secondary alcohols, such as isopropanol, 2-butanol, 2-hexanol, 2-octanol, cyclohexanol and the like, and β-hydroxyalkylsulfonic esters prepared by the reaction of the sulfonic acids and compounds containing oxirane.

The esters of phosphoric acid are, for example, compounds having the formula [7]:

$$(R^{17}-O-)_m-\overset{\overset{O}{\|}}{P}-(-OH)_{3-m} \quad [7]$$

wherein $R^{17}$ is a group of 3 to 10 carbon atoms selected from the group consisting of alkyl group, cycloalkyl group and aryl group and m is 1 or 2. Examples of the ester of phosphoric acid are monoesters and diesters of phosphoric acid with a primary alcohol, such as n-propanol, n-butanol, n-hexanol, n-octanol, 2-ethylhexanol and the like, or a secondary alcohol, such as isopropanol, 2-butanol, 2-hexanol, 2-octanol, cyclohexanol and the like.

The onium compound is a compound having one of the general formulas [8] through [11]:

$$[R^{18}{}_3NR^{19}]^+X^- \quad [8]$$

$$[R^{18}{}_3PR^{19}]^+X^- \quad [9]$$

$$[R^{18}{}_2OR^{19}]^+X^- \quad [10]$$

and $$[R^{18}{}_2SR^{19}]^+X^- \quad [11]$$

wherein $R^{18}$ is a group of 1 to 12 carbon atoms selected from the group consisting of alkyl group, alkenyl group, aryl group, alkaryl group, alkanol group and cycloalkyl group, two $R^{18}$ may be bonded together to form a heterocyclic ring in which N, P, O or S is the hereto atom, $R^{19}$ is a hydrogen atom or a group of 1 to 12 carbon atoms selected from the group consisting of alkyl group, alkenyl group, aryl group and alkaryl group and $X^-$ is selected from the group consisting of $SbF_6^-$, $AsF_6^-$, $PF_6^-$ and $BF_4^-$.

In the thermosetting composition of the invention, either a single kind of the thermal latent acid catalyst (C) or a combination of two or more kinds may be utilized. The amount utilized is usually in the range from 0.01 to 10 weight parts per 100 weight parts of the total solid component which consists of the compound (A) and the compound (B) or compound (D) and optionally utilized compound (A) and/or compound (B).

Time and temperature required to cure the thermosetting composition of the invention is different depending on temperature at which free carboxyl group is regenerated from the blocked functional group of formula [1] or formula [2], kind of the reactive functional group and kind of the thermal latent acid catalyst. In general, curing is completed by heating at the temperature in the range from 50° to 200° F., for the time in the range from 2 minutes to 10 hours.

The thermosetting composition of the invention can be utilized for coating compositions, ink, adhesive, molded plastics and the like without other ingredients and, according to the needs, it may be compounded with coloring pigments, fillers, solvents, ultraviolet adsorbents, antioxidants and other ingredients.

The present invention also provides the novel thermal latent carboxyl compound and the novel method of preparation thereof along with the thermosetting composition described above. The thermal latent carboxyl compound is a compound which is prepared by the reaction of a polycarboxylic acid having two or more carboxyl groups in the molecule, acid equivalent of not more than 1000g/mole and number average molecular weight of not more than 4000, preferably not more than 2000, with a vinyl ether compound, a vinyl thioether compound or a cyclic vinylether compound, such as a heterocyclic compound having vinyl type double bond and an oxygen atom or a sulfur atom as the hereto atom, having the formula [12]:

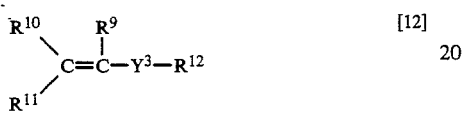

[12]

wherein $R^9$, $R^{10}$, $R^{11}$, $R^{12}$ and $Y^3$ are already defined before, in the presence of acid catalyst at the temperature of preferably in the range from the room temperature and 100° C. The carboxyl group is converted by the reaction to a blocked carboxyl group having the formula [3]:

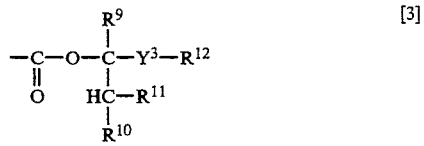

[3]

wherein $R^9$, $R^{10}$, $R^{11}$, $R^{12}$ and $Y^3$ are already defined before.

When the number of carboxyl group in the molecule of polycarboxyl compound utilized for the preparation of the thermal latent carboxyl compound is less than two or when the acid equivalent of the polycarboxyl compound is more than 1000g/mole, curing of the prepared thermosetting composition may not proceed to a sufficient degree. When the number average molecular weight of the polycarboxyl compound is more than 4000, viscosity of the thermosetting composition becomes high and processability is inferior.

The polycarboxyl compound is prepared by (1) half-esterification of a polyol having two or more hydroxyl groups in the molecule with an acid anhydride; (2) addition of a polyisocyanate compound having two or more isocyanate groups in the molecule with a hydroxycarboxylic acid or an amine acid; (3) homopolymerization of α,β-unsaturated monomer having carboxyl group in it or copolymerization of the α,β-unsaturated monomer with other α,β-unsaturated monomers; (4) preparation of polyester resin having carboxyl group and other like methods.

Examples of the materials utilized for the method mentioned above are the same as the examples of the materials utilized for the preparation of the compound comprising two or more carboxyl groups which is the material for the preparation of compound (A).

Examples of the vinyl ether compound, the vinyl thioether compound or the cyclic vinylether compound, such as a heterocyclic compound having vinyl type double bond and an oxygen atom or a sulfur atom as tile hetero atom, having the formula [12] are the same as the examples of the compound of formula [4] which is utilized for the preparation of the compound (A).

The potentially reactive carboxyl compound can be advantageously utilized as the compound (A).

The invention will be understood more readily with reference to the following examples; however these examples are intended to illustrate the invention and are not to be construed to limit the scope of the invention.

Properties of the coated film were evaluated by the following methods.

(1) Resistance to Acid-1

On a test piece, 2 ml of 40 weight % sulfuric acid was applied as spots and condition of the coated film was observed by visual comparison after standing for 48 hour at 20° C.

(2) Resistance to Acid-2

On a test piece, 2 ml of 40 weight % sulfuric acid was applied as spots and condition of the coated film was observed by visual comparison after heating for 30 minutes at 60° C.

(3) Resistance to Acid-3

A test piece was dipped in 0.1N sulfuric acid and the condition of coated film was observed by visual comparison after standing for 24 hours at 60° C.

(4) Impact Resistance

By using an impact tester (Japanese Industrial Standard K-5400 (1979), method of 6.13.3 B), a test piece was clamped to an impact frame of 6.35 mm radius and a weight of 500 g was dropped from the height of 40 cm on the test piece. Damage made on the coating film was observed by visual comparison.

(5) Weathering Resistance

By using a sunshine weathermeter (Japanese Industrial Standard B-7753), a test piece was exposed for 1000 hours or 3000 hours and 60 degree specular gloss (Japanese Industrial Standard K-5400 (1979) 6.7 60 degree specular gloss) of the coating film was measured. Condition of the coating film was observed by visual comparison or compared with the condition before time exposure by using the measured values of gloss.

(6) Knoop Hardness

Measurement was made by using M type micro-hardnessmeter (manufactured by Shimazu Seisakusho, Ltd.) at 20° C. A larger value shows a higher hardness.

(7) Non-Volatile Matter

Non-volatile matter was measured by treating the sample in vacuo of 0.1 mmHg at 50° C. for 3 hours.

(8) Gardener Viscosity

Gardener viscosity was measured by tile method of Japanese Industrial Standard K-5400 (1979) 4.2.2 (bubble tube viscometer).

Abbreviations and trade names used in the examples are listed in the following.

AIBN: 2,2′-azo-bis-isobutyronitrile
BMA: n-butyl methacrylate
EMA: 2-ethylhexyl acrylate
GMA: glycidyl methacrylate
IEM: isocyanatoethyl methacrylate MMA: methyl methacryl ate
PMA: methacrylate containing vinyl ether group prepared by the following method: In a flask equipped with a stopper, a mixture of 130 weight parts of 2-hydroxyethyl methacrylate, 224 weight parts of 3,4-dihydro-2H-yl-methyl-3,4-dihydro-2H-pyran-2-carboxylate and 0.3 weight part of dodecylbenzene sulfonic acid was stirred for 24 hours at the room temperature.
TMSPMA: methacryloyloxypropyltrimethoxysilane
PTSA: p-toluene sulfonic acid
DDBSA: dodecylbenzene sulfonic acid
10% PTSA: 1.0 weight % solution of p-toluene sulfonic acid in isopropyl alcohol.
10% pyridine: 10 weight % solution of pyridine in xylene.
Acid catalyst A: xylene solution of (1-methylethyl) p-toluene sulfonate in Example of preparation of material 14.
Acid catalyst B: xylene solution of (1-methylheptyl) p-toluene sulfonate in Example of preparation of material 15.
Acid catalyst C: xylene solution of (1-methylethyl) p-toluene sulfonate in Example of preparation of material 16.
Acid catalyst D: 10 weight % solution in isobutanol of di-2-ethylhexyl phosphate (a product of Wako Junyaku Co., Ltd. ).
Acid catalyst E: a 10 weight % solution in dimethyl-sufoxide of triethylamine salt of zinc chloride.
Acid catalyst F: a 50 weight % solution in dichloroethane of 3-methyl-2-butinyltetramethylenesulfonium hexafluoroantimonate.
Acid catalyst G: a 20 weight % solution in acetone of 4-methoxybenzylpyridinium hexafluoroantimonate.

Compound B-8 was prepared from a mixture of monomers comprising 28.4 weight % of glycidyl methacrylate, 13.0 weight % of hydroxyethyl methacrylate, 10.0 weight % of butyl methacrylate, 24.7 weight % of methyl methacrylate and 23.9 weight % of 2-ethylhexyl acrylate by the same method as compound B-1 in Example of preparation of material 5 and had 50 weight % of non-volatile matter and Gardener viscosity W.

Compound B-9 was prepared from a mixture of monomers comprising 28.4 weight % of glycidyl methacrylate, 8.3 weight % of methaeryloyloxypropyltrimethoxysilane, 20.0 weight % of butyl methacrylate, 27.7 weight % of methyl methacrylate and 15.6 weight % of 2-ethylhexyl acrylate by the same method as the compound B-1 in Example of preparation of material 5 and had 50 weight % of non-volatile matter and Gardener viscosity U.

C-1203 ®: Vesturit Catalyst 1203, a product of Impecs Chemicals Co., Ltd., nonionic thermal latent acid catalyst, non-volatile matter 50 weight %.
Chemitite PZ-33 ®: a product of Nippon Shokubai Kagaku Kogyo Co., Ltd., polyaziridine, content of aziridine 6.2 mole/kg.
Coronate EH ®: a product of Nippon Polyurethane Industry Co, , Ltd., trimer of hexamethylene diisocyanate, content of isocyanate 21 weight %.
Coronate 2513 ®: a product of Nippon Polyurethane Industry Co., Ltd. (blocked polyisocynate of no yellowing, low temperature dissociation type, non-volatile matter 80 weight %, isocyanate content 10.2 weight %).
Cymel 303 ®: a product of Mitsui Cyanamido Co., Ltd., methylated melamine resin, non-volatile matter 98 weight %.
Denacol EX-421 ®: a product of Nagase Kasei Kogya Co., Ltd., a polyepoxy compound having epoxy equivalent of 155.
Flexorez UD 320 ®: a product of King Co., Ltd., urethane diol, non-volatile matter 97.5 weight %, hydroxyl value 350.
K-Flex 188-50 ®: a product of King Co., Ltd., polyester diol, non-volatile matter 96 weight %, hydroxyl value 235.
KR-2140: a product of Shinetsu Chemical Co.,Ltd., silicone vanish, hydroxyl equivalent 490, non-volatile matter 70 weight %.
MAGME: MAGME 100 ®, a product of Mitsui Cyanamide Co., Ltd., methylacrylamide glycolate methyl ether.
Modaflow ®: a product of Monsanto Co., a leveling agent.
MZ-11: Chemitite MZ-11 ®, a product of Nippon Shokubai Kagaku Kogyo Co., Ltd., 2-(1-aziridinyl)ethyl methacrylate
Praccel E-488 ®: a product of Daicel Chemical Industries Co., Ltd., caprolactone polyol, hydroxyl value 579.
Silicone KR-213 ®: a product of Shinetsu Chemical Co., Ltd., a methoxysilicone compound, methoxy group equivalent 160.
Titanium dioxide JR-602 ®: a product of Teikoku Kako Co., Ltd., titanium dioxide of futile type.

EXAMPLE OF PREPARATION OF MATERIAL 1-3

Three kinds of the compound (A), A-1, A-2 and A-3, were prepared.

(1) Preparation of α,β-Unsaturated Compound

A mixture shown in Table 1 was charged into a four-necked flask which is equipped with a thermometer, a reflux condenser and a stirrer and stirred at 50° C. The reaction was finished when tile acid value of the mixture decreased to a value less than 30 and the reaction mixture was transferred to a separating funnel after cooling by standing. The reaction mixture was washed with 100 weight part of alkaline water containing 10 weight % of sodium bicarbonate in the funnel and then washed with 200 weight parts of deionized water repeatedly until the pit of the washing water became below 7. The organic layer was dried by adding Molecular Sieve 4A1/16 (a product of Wako Junyaku Co., Ltd.) and standing for 3 days at the room temperature. The α,β-unsaturated compounds obtained by this process, A-1(a), A-2(a) and A-3(a), contained effective components in the amount shown in Table 1. The content of the effective components were determined by gas chromatography.

(2) Preparation of Compounds A-1, A-2 and A-3

Into a four-necked flask equipped with a thermometer, a reflux condenser, a stirrer and a dropping funnel, an initial portion of solvent which was xylene was charged in an amount shown in Table 2, heated under stirring and kept at 80° C. A mixture of monomers and a polymerization initiator shown in Table 2 ('component of dropped mixture') was added by dropping to the solvent at 80° C. at a constant rate for 2 hours. When the addition of the dropping component was finished, the mixture was kept at 80° C. for further 1 hour and, then, an additional amount of initiator solution shown in Table 2 ('additional catalyst') was added to the mixture. The mixture was kept at 80° C. for 4 hours before finishing the reaction and finally the compounds A-1, A-2 and A-3 having the properties shown in Table 2 were obtained.

EXAMPLE OF PREPARATION OF MATERIAL 4

One kind of the compound (A), A-4, was prepared.

(1) Preparation of Polycarboxylic Acid

Into a four-necked flask equipped with a thermometer, a reflux condenser, a stirrer and a dropping funnel, the following components were charged and the mixture was heated under stirring until the temperature reached to 120° C.

| pentaerythritol | 136.0 weight parts |
|---|---|
| methyl isobutyl ketone | 538.7 weight parts |

To the mixture kept at 120° C. 672.0 weight parts of methylhexahydrophthalic anhydride was added by dropping for 2 hours and the mixture was kept stirring under heating until acid value of the mixture decreased to a value not more than 170. The acid value was measured by diluting the sample 50 times by weight with a mixture of pyridine and water (pyridine/water 9/1 by weight), heating for 30 minutes at 90° C. and titrating with a standard solution of potassium hydroxide. Thus, a solution of a tetrafunctional polycarboxyl compound was prepared.

(2) Preparation of Compound A-4

Into a flask of the same kind as the above, a mixture of the following composition including the solution of the polycarboxyl compound prepared above was charged and kept stirring at 50° C.

| the solution of polycarboxyl compound of (1) | 336.7 |
|---|---|
| isobutyl vinyl ether | 120.2 |
| hydrochloric acid, 35 weight % | 0.2 |
| methyl isobutyl ketone | 46.3 |
| | (quantity in weight parts) |

The reaction was finished when acid value of the mixture decreased to a value not more than 12 and the mixture was transferred to a separating funnel after cooling by standing. The reaction mixture was washed with 100 weight parts of alkaline water containing 10 weight % of sodium bicarbonate in tile funnel and then washed with 300 weight parts of deionized water repeatedly until the pH of the washing water became below 7. The organic layer was dried by adding Molecular Sieve 4A1/16 (a product of Wako Junyaku Co., Ltd. ) and standing for 3 days at the room temperature.

The solution of the compound A-4 thus prepared had 60 weight % of non-volatile matter and Gardener viscosity of E-F at 25° C.

EXAMPLE OF PREPARATION OF MATERIAL 5 THROUGH 10

Six kinds of the compound (B), compounds B-1 through B-6, were prepared by the following method.

Into a four-necked flask equipped with a thermometer, a reflux condenser, a stirrer and a dropping funnel, 40.0 weight parts of solvent which was xylene was charged, heated under stirring and kept at 100V. A mixture of monomers and a polymerization initiator shown in Table 3 ('component of dropped mixture') was added by dropping to the solvent at 100° C. at a constant rate for 2 hours. When the addition of the dropping component was finished, the mixture was kept at 100° C., for further 1 hour and, then, an additional amount of initiator solution shown in Table 3 ('additional catalyst') was added to the mixture. The mixture was kept at 100° C. for 2 hours before finishing the reaction and finally the compounds B-1 through B-6 having the characteristics shown in Table 3 were obtained.

EXAMPLE OF PREPARATION OF MATERIAL 11

One kind of compound (B), compound B-7, was prepared by the following method.

Into a four-necked flask equipped with a thermometer, a reflux condenser, a stirrer and a dropping funnel, 206.0 weight parts of methyl orthoformate and 0. 3 weight part of boron trifluoride diethyl etherate were charged and the mixture was kept at 0°–5° C. by stirring under cooling by ice. To the mixture, 87.7 weight parts of butyl vinyl ether were added by dropping from a dropping funnel at a constant rate for 2 hours while temperature of the mixture was kept below 5° C. The mixture was kept below 5° C. for further 1 hour after finishing the dropping and, then, 0. 4 weight parts of 30 weight % methanol solution of sodium methylate were added to the mixture to finish the reaction. The acetal product obtained by distillation of the reaction product at 75°–80° C. (4 mmHg) contained 98 weight % of the effective component.

Into a four-necked flask equipped with a thermometer, a reflux condenser inserted with a Dienstag trap, a stirrer and a dropping funnel, 618 weight parts of the purified acetal product, 134 weight parts of trimethylolpropane and 4 weight parts of p-toluene sulfonic acid were charged and the mixture was kept at 90° C. by stirring under heating. Methanol was continuously removed while the reaction proceeded. When 96 weight parts of methanol were recovered, the reaction was finished and compound B-7 was obtained.

EXAMPLE OF PREPARATION OF MATERIAL 12 AND 13

Two kinds of compound (D), compounds D-1 and D-2, were prepared by the following method.

Into a four-necked flask equipped with a thermometer, a reflux condenser, a stirrer and a dropping funnel, an initial portion of solvent which was xylene was charged in an amount shown in Table 4, heated under stirring and kept at 80° C. A mixture of monomers and a polymerization initiator shown in Table 4 ('component of dropped mixture') was added by dropping to the solvent at 80° C. at a constant rate for 2 hours. When the addition of the dropping component was finished, the mixture was kept at 80° C. for further 1 hour and, then, an additional amount of initiator solution shown in Table 4 ('additional catalyst') was added to the mixture. The mixture was kept at 80° C. for 4 hours before finishing the reaction and finally the compounds D-1 and D-2 having the properties shown in Table 4 were obtained.

EXAMPLE OF PREPARATION OF MATERIAL 14

Thermal latent acid catalyst (C) was prepared by the following method.

Into a flask equipped with a stirrer, a thermometer, a dropping funnel and a reflux condenser, 315 weight parts of 2-propanol were charged and the flask was cooled by an ice bath. Potassium t-butoxide, 44.9 weight parts, was added to 2 propanol to dissolved in it and a solution of 53.4 weight parts of p-toluene sulfonyl chloride in 300 weight parts of diethyl ether was added to the solution by dropping in 30 minutes. After one hour, the ice bath was removed from the flask and the reaction was continued for further 1 hour. After tile reaction was finished, the reaction mixture was washed with 300 weight parts of water three times and dried with Molecular Sieve 4A1/16 (a product of Wako Junyaku Co., Ltd.). After removing the solvent by using an evaporater, 40 weight parts of 1-methylethyl p-toluenesulfonate were obtained (yield 67%). The thermal latent acid catalyst thus prepared was dissolved in 238 weight parts of xylene to form a solution of 10 weight % based on p-toluene sulfonic acid.

EXAMPLE OF PREPARATION OF 15 AND 16

In Example of preparation of material 15, 2-octanol was used in place of 2-propanol in Example of preparation of material 14. In Example of preparation of material 16, dodecylbenzene sulfonyl chloride was used in place of p-toluene sulfonyl chloride in Example of preparation of material 14. Other procedures were made in the same way as Example of preparation of material 14. In Example of preparation of material 15, 1-methylheptyl p-toluenesulfonate was obtained in the yield of 72% and, in Example of preparation of material 16, 1-methylethyl dodecylbenzene sulfonate was obtained in the yield of 83%.

The thermal latent acid catalysts thus prepared were dissolved in xylene to form a solution of 10 weight % based on p-toluene sulfonic acid and dodecylbenzene sulfonic acid in the same way as Example of preparation of material 14.

Preparation of thermal latent polycarboxyl compounds are shown in Examples 1 through 8.

EXAMPLE 1

(1) Preparation of Polycarboxyl Compound

Into a flask equipped with a thermometer, a reflux condenser and a stirrer, 134.0 weight parts of trimethylolpropane, 462.0 weight parts of hexahydrophthalic anhydride and 149.0 weight parts of methyl isobutyl ketone were charged and the mixture was heated with stirring to the refluxing temperature for 6 hours. The mixture was kept stirring under heating until acid value of the mixture decreased to a value not more than 226 and a solution of a polycarboxyl compound was prepared. The acid value was measured by diluting the sample 50 times by weight with a mixture of pyridine and water (pyridine/water 9/1 by weight), heating for 30 minutes at 90° C. and titrating with a standard solution of potassium hydroxide.

(2) Preparation of Thermal Latent Carboxyl Compound

Into a flask of the same kind as the above, a mixture of the following composition including the solution of the polycarboxyl compound prepared above was charged and kept stirring at the room temperature.

| | |
|---|---:|
| the solution of polycarboxyl compound of (1) | 248.3 |
| ethyl vinyl ether | 108.0 |
| monooctyl phosphate | 0.6 |
| xylene | 76.4 |
| (quantity in weight parts) | |

The reaction was finished when acid value of the mixture decreased to a value not more than 3 and 10 weight parts of Kyowaad 500 ® (a synthetic acid adsorbent, a product of Kyowa Chemical Industry Co., Ltd. ) was added to the reaction mixture. The mixture was stirred for 48 hours at the room temperature and filtered. After 36.0 weight parts of the solvent were removed from the filtrate by using an evaporater, a solution of the thermal latent carboxyl compound [1] having 50 weight % of effective component and Gardener viscosity of F-G was obtained

EXAMPLES 2, 3 AND 4

(1) Preparation of Polycarboxyl Compound

Into a flask similar to the flask in Example 1 (1), a mixture having the composition shown in Table 5 was charged and treated in the same way as in Example 1 (1). [tearing under stirring was made until acid value of the mixture deceased to 170 in Example 2, to 117 in Example 3 and to 145 in Example 4 and a solution of polycarboxyl compound was prepared in each example.

(2) Preparation of Thermal Latent Carboxyl Compound

Mixtures having the compositions shown in Table 6 were treated in the same way as in Example 1 (2) and solutions of thermal latent carboxyl compounds [2], [3] and [4] having properties shown in Table 6 were prepared.

EXAMPLE 5

(1) Preparation of Polycarboxyl Compound

Into a four-necked flask equipped with a thermometer, a reflux condenser fitted with a Dienstag trap and a stirrer, 480.0 weight parts of Silicone KR-2130, 312.0 weight parts of neopentyl glycol and 0. 8 weight part of p-toluene sulfonic acid were charged and the mixture was heated to 160° C. under stirring and kept at the temperature. When the reaction started, the reaction was kept going by elimination of methanol above 140° C. until 96 weight parts of methanol were recovered. Then, Dienstag trap was removed and 462.0 weight parts of hexahydrophthalic anhydride and 288.7 weight parts of methyl isobutyl ketone were added to the flask. In the procedures similar to the one in Example 1 (1), heating under stirring was continued until acid value of the mixture decreased to a value not more than 117 to obtain a solution of polycarboxyl compound.

(2) Preparation of Thermal Latent Carboxyl Compound

A mixture having the following composition was treated by the same procedure as in Example 1 (2). When 43 weight parts of solvent were removed by an solution evaporater, a solution of thermal latent carboxyl compound [5] having 50 % of effective component and Gardener viscosity J-K was prepared.

| | |
|---|---:|
| the solution of polycarboxyl compound of (1) | 479.6 |

-continued

| | |
|---|---|
| n-propyl vinyl ether | 129.0 |
| monooctyl phosphate | 1.2 |
| xylene | 200.6 |
| (quantity in weight parts) | |

EXAMPLE 6

(1) Preparation of Polycarboxyl Compound

Into a flask similar to the one in Example 1 (1), 200.0 weight parts of Coronate EH ®, 300.0 weight parts of 12-hydroxystearic acid and 1.25 weight parts of butyl acetate were charged and the mixture was kept at 100° C. under stirring. The reaction was finished when the content of isocyanate in the mixture decreased to not more than 0.1 weight % and a solution of polycarboxyl compound was prepared.

(2) Preparation of Thermal Latent Carboxyl Compound

A mixture having the following composition was treated by the same procedure as in Example i (2). When 43 weight parts of solvent were removed by an evaporater, a solution of thermal latent carboxyl compound [6] having 50 weight % of effective component and Gardener viscosity L-M was prepared.

| | |
|---|---|
| the solution of polycarboxyl compound of (1) | 625.0 |
| n-propyl vinyl ether | 129.0 |
| monooctyl phosphate | 1.5 |
| xylene | 287.5 |
| (quantity in weight parts) | |

EXAMPLE 7

(1) Preparation of Polycarboxyl Compound

Into a flask similar to the one in Example 1(1), 200.0 weight parts of Coronate EH ®, 75.1 weight parts of glycine and 68.8 weight parts of N-methylpyrrolidone were charged. A solution of polycarboxyl compound was prepared by the same method as in Example 6 (1)

(2) Preparation of Thermal Latent Carboxyl Compound

A mixture having the following composition was treated by the same procedure as in Example 1 (2). When 42 weight parts of solvent were removed by an evaporater, a solution of thermal latent carboxyl compound [7] having 50 weight % of effective component and Gardener viscosity S-T was prepared.

| | |
|---|---|
| the solution of polycarboxyl compound of (1) | 343.9 |
| 3,4-dihydro-2H-pyran | 126.0 |
| monooctyl phosphate | 0.8 |
| methyl isobutyl ketone | 121.5 |
| (quantity in weight parts) | |

EXAMPLE 8

(1) Preparation of $\alpha,\beta$-Unsaturated Compound

Into a flask similar to the one in Example 1 (1), 86.0 weight parts of methacrylic acid, 100.9 weight parts of 3,4-dihydro-2H-pyran, 0.2 weight part of hydroquinone monomethylether and 0.1 weight part of 35 weight % hydrochloric acid were charged and the mixture was kept at 50° C. under stirring. The reaction was finished when acid value of the mixture decreased to a value not more than 30 and the reaction product was transferred to a separating funnel after cooling. The reaction product in the separating funnel was washed with 100 weight parts of 10 weight % aqueous solution of sodium bicarbonate and then with 200 weight parts of deionized water repeatedly until pH of the washing liquid decreased to not more than 7. Molecular Sieve 4A1/16 (a product of Wako Junyaku Co., Ltd.) was added to the organic layer and dried for 3 days at the room temperature to obtain $\alpha,\beta$-unsaturated compound containing 95.1 weight % of effective component.

(2) Preparation of Thermal Latent Carboxyl Compound

Into a four-necked flask equipped with a thermometer, a reflux condenser, a stirrer and a dropping funnel, 200 weight parts of xylene were charged, heated and kept at 100° C. under stirring. Then, a mixture of the following composition was added by dropping at a constant rate in 2 hours while the temperature was kept at 100° C. When the dropping was finished, the mixture was kept at 100° C. for further 30 minutes and then a solution in which 3.0 weight parts of 2,2'-azo-bis-isobutyronitrile was dissolved in 57.0 weight parts of n-butyl acetate was added to the mixture. The reaction was finished after the reaction mixture was kept at 100° C. for 2 hours and thermal latent carboxyl compound [8] having 50 weight % of effective component and Gardener viscosity O-P was prepared.

| | |
|---|---|
| the $\alpha,\beta$-unsaturated compound of (1) | 178.8 |
| n-butyl methacrylate | 100.0 |
| methyl methacrylate | 178.6 |
| 2-ethylhexyl acrylate | 135.4 |
| n-butyl acetate | 115.0 |
| 2,2'-azo-bis-isobutyronitrile | 32.2 |
| (quantity in weight parts) | |

Results of Examples 1 through 8 are summarized in Table 7.

COMPARATIVE EXAMPLE OF PREPARATION OF MATERIAL 1

Compound A-5 was prepared by the following method.

Into a four-necked flask equipped with a thermometer, a reflux condenser, a stirrer and a dropping funnel, 200 weight parts of xylene were charged, heated and kept at 80° C. under stirring. Then, a mixture of the following components were added from the dropping funnel by dropping at a constant rate in 2 hours while the temperature was kept at 80°πC.

| | |
|---|---|
| t-butyl methacrylate | 142.0 weight parts |
| n-butyl methacrylate | 100.0 weight parts |
| methyl methacrylate | 178.6 weight parts |
| 2-ethylhexyl acrylate | 105.4 weight parts |
| n-butyl acetate | 192.2 weight parts |
| 2,2'-azo-bis-isobutyronitrile | 21.8 weight parts |

After the dropping was finished, the reaction mixture was kept at 80° C. for further 1 hour and 57.0 weight parts of n-butyl acetate and 3.0 weight parts of 2,2'-azo-bisisobutyronitrile were added. When the mixture was kept at 80° C. for 4 hours, compound A-5 having 52.8 weight % of non-volatile matter and Gardener viscosity S-T.

EXAMPLES 9 THROUGH 19

These examples show application of the composition to one coat solid color coating.

(1) Preparation of Coating Compositions

Components summarized in Table 8 were utilized for the preparation of the coating compositions. A part of or all materials were charged into a sand mill and dispersed until the particle size decreased to not more than 10μm. Materials excluding following components were charged into the sand mill: Denacol EX-421 ® in Example 9, the compound B-2 in Example 10, Chemitite PZ-33 ® in Example 11, the compound h-4 in Example 12, Coronate EH ® in Example 13, Cymel 303 ® in Example 14, the compound B-1 in Example 15, KR-214 ® in Example 16, the compound B-7 in Example 17 and Cymel 303 ® in Example 19. All the raw materials were charged into the sand mill in Example 18. In Examples 9 through 17 and Example 19, one component coating compositions were prepared by adding the materials which were not treated by the sand mill to the materials treated by the sand mill. In Example 18, the materials treated by the sand mill were utilized for the preparation of one component coating compositions. The coating compositions prepared were diluted by a thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 9 show that the increase of viscosity was very slight in all cases and that the coating compositions had excellent storage stability.

(2) Preparation of Test Piece

Cationic electro coating paint AQUA No.4200 ® (a product of Nippon Oil and Fats Co., Ltd.) was applied by electrodeposition to a soft steel plate treated with zinc phosphate in an amount to form a film having dried thickness of 20μm and the coated plate was baked at 175° C. for 25 minutes. Intermediate coating paint EPICO No. 500CP Sealer ® (a product of Nippon Oil and Fats Co., Ltd.) was applied to the prepared plate by air spraying in an amount to form a film having dried thickness of 40μm and the plate was baked at 140° C. for 30 minutes to obtain a base test piece.

The raw coating compositions prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 9.

Results of the evaluation of coatings are shown in Table 9. In all cases, uniform coating having good gloss were prepared. All the coatings showed excellent acid resistance, impact resistance, weathering resistance and hardness when they were cured at 140° C.

Weathering resistance was evaluated by exposure for 1000 hours.

COMPARATIVE EXAMPLES 1 AND 2

Components listed in Table 10 were utilized for the preparation of the coating compositions. The components were dispersed and made into coating compositions by the same method as in Examples 9 through 19. The materials excluding Denacol EX-421 ® in Comparative example 1 and the materials excluding polycarboxylic acid of Example of preparation of material A-4 (a) in Comparative example 2 were dispersed by using a sand mill and utilized for preparation of coating compositions.

The coating compositions thus prepared were evaluated on the storage stability in the same way as in Examples 9 through 19. In the case of Comparative example 2 shown in Table 11, viscosity increased remarkably with the period of storage, leading finally to gellation after 5 days, because neither carboxyl group or epoxy group was blocked to prevent crosslinking reaction of the both functional groups under the storage condition.

Test pieces were prepared by the same method as in Examples 9 through 19 by using coating compositions prepared in the present comparative examples and evaluated. The test piece of Comparative example 1 which corresponded to the material disclosed in Japanese Laid-open Patent Publication Heisei 1-104646 did not give cured film having satisfactory properties even when it was cured at 140° C. but gave a film having inferior acid resistance, impact resistance, weathering resistance and hardness as clearly shown in Table 11.

EXAMPLES 20 THROUGH 23

These examples show application of the composition to two coat one bake metallic color coating.

(1) Preparation of Clear Coating

One component clear coating compositions were prepared by mixing raw materials shown in Table 12. The clear coating compositions prepared were evaluated on storage stability by the same method as in Example 9 through 19. Increase of viscosity was very slight in all cases tested and the coating compositions were shown to have excellent storage stability as shown in Table 13.

2) Preparation of Test Piece

Raw coating compositions thus prepared were di luted in the same method as in Examples 9 through 19. Base test pieces were also prepared in the same method as in Examples 9 through 19. A silver metallic base coating composition, BELCOAT No. 6000 ® (a product of Nippon Oil and Fats Co., Ltd. ) was applied to the base test piece by air spraying with interval of 1 minute 30 seconds in 2 stages in an amount to form a film having dried thickness of 15 μm. After the test pieces were set at 20° C. for 3 minutes, the diluted raw clear coating compositions were coated by air spray coating and the test pieces were cured in the condition shown in Table 13 to prepare final test pieces.

Results of the evaluation listed in Table 13 show that, in all cases, uniform coatings having good gloss were prepared and the coating showed excellent acid resistance, impact resistance, weathering resistance and hardness when they were cured at 140° C.

Weathering resistance was evaluated by exposure for 3000 hours.

COMPARATIVE EXAMPLES 3 AND 4

Clear coating compositions were prepared by using raw materials listed in Table 14 and storage stability was evaluated in the same method as in Examples 9 through 19. In the case of Comparative example 4 shown in Table 15, gellation took place after 5 days because neither carboxyl group or epoxy group was blocked to prevent the crosslinking reaction under the storage condition.

Test pieces were prepared by using coating compositions prepared above and evaluated in the same method as in Examples 20 through 23. The test piece of Comparative example 3 which corresponded to the material disclosed in Japanese Laid-open Patent Publication Heisei 1-104646 did not give cured film having satisfactory properties even when it was cure at 140° C. but gave a film having inferior acid resistance, impact resistance, weathering resistance and hardness as clearly shown in Table 15.

EXAMPLES 24 THROUGH 34

These examples show application of the composition to one coat solid color coating.

(1) Preparation of Coating Material

Components summarized in Table 16 were utilized for the preparation of the coating materials. A part of or all materials were charged into a sand mill and dispersed until the particle size decreased to not more than 10 μm. Materials excluding following components were charged into the sand mill: Denacol EX-4210 in Example 24, the compound B-2 in Example 25, Chemitite PZ-33 ® in Example 26, the compound A-4 in Example 27, Coronate EH ® in Example 28, Cymel 303 ® in Example 29, the compound B-1 in Example 30, KR-214 ® in Example 31, the compound B-7 in Example 32 and Cymel 303 ® in Example 34. All the raw materials were charged into the sand mill in Example 33. In Examples 24 through 32 and Example 34, one component coating compositions were prepared by adding the materials which were not treated by the sand mill to the materials treated by the sand mill. In Example 33, the materials treated by the sand mill were utilized for the preparation of one component coating composition. The coating compositions prepared were diluted by thinner (a mixture of xylene and butyl acetate in 8 to 2 weight ratio) to the viscosity of 1 poise (measured by Brookfield type viscometer at 20° C.) and stored in a sealed condition at 50° C. After the coating compositions were stored for 30 days at 50° C., viscosity was measured. The results summarized in Table 17 show that the increase of viscosity was very slight in al I cases and that the coating materials had excellent storage stability.

(2) Preparation of Test Piece

Cationic electro coating paint AQUA No. 4200 ® (a product of Nippon Oil and Fats Co., Ltd. ) was applied by electrodeposition to a soft steel plate treated with zinc phosphate in an amount to form a film having dried thickness of 20 μm and the coated plate was baked at 175° C. for 25 minutes. Intermediate coating paint EPICO No. 1500CP Sealer ® (a product of Nippon Oil and Fats Co., Ltd. ) was applied to the prepared plate by air spraying in an amount to form a film having dried thickness of 40 μm and the plate was baked at 140° C. for 30 minutes to obtain a base test piece.

The raw coating materials prepared in (1) were diluted with thinner (a mixture of xylene and butyl acetate in 8 to 2 ratio) to a viscosity required for spraying (25 seconds at 20° C. by Ford cup No. 4) and applied to the base test piece prepared before by air spray coating. Test pieces were prepared by curing the coated pieces in the conditions shown in Table 17.

Results of the evaluation of coatings are shown in Table 17. In all cases, uniform coating having good gloss were prepared. All the coatings showed excellent acid resistance, imp&ct resistance, weathering resistance &rid hardness.

Weathering resistance was evaluated by exposure for 1000 hours.

COMPARATIVE EXAMPLE 5

Components listed in Table 18 were utilized for the preparation of the coating compositions. The components were dispersed and made into coating compositions by the same method as in Examples 24 through 34. The materials excluding polycarboxylic acid of Example of preparation of material A-4 (a) were dispersed by using a sand mill and utilized for preparation of coating compositions.

The coating materials thus prepared were evaluated on the storage stability in the same way as in Examples 24 through 34. As shown in Table 19, viscosity increased remarkably with the period of storage, leading finally to gellation in the fifth day, because neither carboxyl group or epoxy group was blocked to prevent crosslinking reaction of the both functional groups under the storage condition.

Weathering resistance was evaluated by exposure for 1000 hours.

EXAMPLES 35 THROUGH 41

These examples show application of the composition to two coat one bake metallic color coating.

(1) Preparation of Clear Coating Compositions

One component clear coating compositions were prepared by mixing raw materials shown in Table 20. The clear coating compositions prepared were evaluated on storage stability by the same method as in Example 24 through 34. As shown in Table 21, increase of viscosity was very slight in all cases tested and coating materials were shown to have excellent storage stability.

2) Preparation of Test Pieces

Raw coating materials thus prepared were diluted in the same method as in Examples 24 through 34. Base test pieces were also prepared in the same method as in Examples 24 through 34. A silver metallic base coating composition BELCOAT No. 6000 ® (a product of Nippon Oil and Fats Co., Ltd.) was applied to the base test piece by air spraying with interval of 1 minute 30 seconds in 2 stages in an amount to form a film having dried thickness of 15 μm. After the test piece was set at 20° C. for 3 minutes, the diluted raw clear coating compositions were coated by air spray coating and the test pieces were cured in the condition shown in Table 21 to prepare final test pieces.

Results of evaluation listed in Table 21 show that, in all cases, uniform coating films having good gloss were prepared and the coating showed excellent acid resistance, impact resistance, weathering resistance and hardness.

Weathering resistance was evaluated by exposure for 3000 hours.

COMPARATIVE EXAMPLE 6

Clear coating compositions were prepared by using raw materials listed in Table 22 and storage stability was evaluated in the same method as in Examples 24 through 34. As shown in Table 23, in the case of Comparative example 6, gellation took place after 5 days because neither carboxyl group or epoxy group was blocked to prevent the crosslinking reaction under the storage condition.

Weathering resistance was evaluated by exposure for 3000 hours.

EXAMPLE 42 THROUGH 50

These examples show application of the composition to two coat one bake metallic color coating.

(1) Preparation of Clear Coating Compositions

One component clear coating compositions were prepared by mixing raw materials shown in Table 24. The coating compositions prepared were di lured by thinner (a mixture of xylene and butyl acetate in 8 to 2 weight ratio) to the viscosity of 1 poise (measured by Brookfield type viscometer at 20Y;) and stored in a sealed condition at 50° C. After the coating compositions were stored for 30 days at 50° C. viscosity was measured. The results summarized in Table 25 show that the increase of viscosity was very slight in all cases and that the coating compositions had excellent storage stability.

(2) Preparation of Test Pieces

Cationic electro coating paint AQUA No. 4200 ® (a product of Nippon Oil and Fats Co., Ltd.) was applied by electrodeposition to a soft steel plate treated with zinc phosphate in an amount to form a film having dried thickness of 20 μm and the coated plate was baked at 175° C. for 25 minutes. Intermediate coating paint EPICO No. 1500CP Sealer ® (a product of Nippon Oil and Fats Co., Ltd.) was applied to the prepared plate by air spraying in an amount to form a film having dried thickness of 40 μm and the plate was baked at 140° C. for 30 minutes to obtain a base test piece.

A silver metallic base coating composition BEL-COAT No. 6000 ® (a product of Nippon Oil and Fats Co., Ltd.) was applied to the base Lest piece by air spraying with interval of 1 minute 30 seconds in 2 stages in an amount to form a film having dried thickness of 15 μm. After the test pieces were set at 20° C. for 3 minutes, the clear coating compositions prepared in (1) and diluted to a viscosity required for spraying (25 seconds by Ford cup No.4 at 20° C.) were coated by air spray coating and the test pieces were cured in the condition shown in Table 25 to prepare final test pieces.

Results of evaluation listed in Table 25 show that, in all cases, uniform coating films having good gloss were prepared and the coating showed excellent acid resistance, impact resistance, weathering resistance and hardness.

Weathering resistance was evaluated by exposure for 3000 hours.

COMPARATIVE EXAMPLE 7

Clear coating composition was prepared from 33.1 weight parts of solution of polycarboxyl compound prepared in Example 2 (1), 100 weight parts of compound B-2, 2.0 parts of acid catalyst-B, 0.3 weight part of Modaflow, 100 weight parts of xylene and 2.0 weight parts of n-butyl acetate and evaluated on storage stability by the same method as in Example 42 through 50. The clear coating composition prepared here gelatinized after 3 days because it did not comprise thermal latent carboxyl compound unlike the material in Example 43.

EXAMPLE 51 THROUGH 53

These examples show application of the composition to two coat one bake metallic color coating.

(1) Preparation of Clear Coating Compositions

One component clear coating compositions were prepared by mixing the materials shown in Table 26. The coating compositions prepared were diluted with thinner (a mixture of xylene and n-butyl acetate in 8/2 ratio) to the viscosity of 1 poise (measured by Brookfield type viscometer at 20° C.) and stored at 50° C. in a sealed condition. After the storage for 30 days at 50° C., viscosity of the compositions was measured again. Results listed in Table 27 show that the increase of viscosity was very slight in all cases and exhibited excellent storage stability of the coating compositions.

(2) Preparation of Test Pieces

A silver metallic base coating composition BEL-COAT No. 6000 ® (a product of Nippon Oil and Fats Co., Ltd.) was applied to the base test piece, which was prepared by the same method as in Example 9 through 19 (2) and coated with intermediate coating composition, by air spraying with interval of 1 minute 30 seconds in 2 stages in an amount to form a film having dried thickness of 15 μm. After the test pieces were set at 20° C. for 3 minutes, the diluted raw clear coating compositions were coated by air spray coating and the test pieces were cured in the condition shown in Table 27 to prepare final test pieces.

Results of evaluation listed in Table 27 show that, in all cases, uniform coating films having good gloss were prepared and the coating showed excellent acid resistance, impact resistance, weathering resistance and hardness.

Weathering resistance was evaluated by exposure for 3000 hours.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the thermosetting composition of the invention gives cured products having excellent chemical properties, physical properties and weathering resistance and is favorably utilized in coating compositions, ink, adhesive and molded plastics.

The thermal latent carboxyl compound of the invention is favorably utilized to provide the thermosetting composition having the above excellent characteristics and efficiently prepared by the method of preparation of the invention.

TABLE 1

| Example of preparation of material | 1 | 2 | 3 |
|---|---|---|---|
| $\alpha,\beta$-unsaturated compound composition of the material, weight part | A-1(a) | A-2(a) | A-3(a) |
| methacrylic acid | 86.0 | 86.0 | 86.0 |
| ethyl vinyl ether | 86.5 | — | — |
| isobutyl vinyl ether | — | 120.2 | — |
| 3,4-dihydro-2H-pyran | — | — | 100.9 |
| hydroquinone monomethyl ether | 0.2 | 0.2 | 0.2 |
| hydrochloric acid, | 0.1 | 0.1 | 0.1 |

TABLE 1-continued

| Example of preparation of material | 1 | 2 | 3 |
|---|---|---|---|
| 35 weight % content of the effective component, weight % | 94.5 | 95.3 | 95.1 |

TABLE 2

| Example of preparation of material | 1 | 2 | 3 |
|---|---|---|---|
| compound A | A-1 | A-2 | A-3 |
| xylene | 200.0 | 200.0 | 200.0 |
| composition of dropped mixture, weight part | | | |
| compound A-1(a) | 167.2 | — | — |
| compound A-2(a) | — | 195.2 | — |
| compound A-3(a) | — | — | 178.8 |
| n-butyl methacrylate | 100.0 | 100.0 | 100.0 |
| methyl methacrylate | 178.6 | 178.6 | 178.6 |
| 2-ethyl hexyl acrylate | 135.4 | 135.4 | 135.4 |
| n-butyl acetate | 135.9 | 106.8 | 123.8 |
| AIBN | 22.9 | 24.0 | 23.4 |
| additional catalyst, weight part | | | |
| n-butyl acetate | 57.0 | 57.0 | 57.0 |
| AIBN | 3.0 | 3.0 | 3.0 |
| properties | | | |
| non-volatile matter, weight % | 57.2 | 60.1 | 58.5 |
| Gardener viscosity | R-S | W-X | U |

TABLE 3

| Example of preparation of material | 5 | 6 | 7 | 8 | 9 | 10 |
|---|---|---|---|---|---|---|
| compound (B) | B-1 | B-2 | B-3 | B-4 | B-5 | B-6 |
| composition of dropped mixture, weight part | | | | | | |
| GMA | 28.40 | — | — | — | — | — |
| TMSPMA | — | 16.60 | — | — | — | — |
| MZ-11 | — | — | 31.00 | — | — | — |
| MAGME | — | — | — | 19.22 | — | — |
| IEM | — | — | — | — | 31.00 | — |
| PMA | — | — | — | — | — | 35.40 |
| BMA | 20.00 | 20.00 | 20.00 | 20.00 | 20.00 | 20.00 |
| MMA | 27.70 | 51.19 | 25.10 | 33.80 | 25.10 | 19.20 |
| EHA | 23.90 | 12.21 | 23.90 | 28.90 | 23.90 | 25.40 |
| AIBN | 2.00 | 2.00 | 2.00 | 2.00 | 2.00 | 2.00 |
| n-butyl acetate | 54.00 | 54.00 | 54.00 | 52.08 | 54.00 | 54.00 |
| additional catalyst, weight part | | | | | | |
| n-butyl acetate | 3.80 | 3.80 | 3.80 | 3.80 | 3.80 | 3.80 |
| AIBN | 0.20 | 0.20 | 0.20 | 0.20 | 0.20 | 0.20 |
| properties | | | | | | |
| non-volatile matter, weight % | 50.8 | 50.5 | 51.0 | 50.2 | 51.3 | 51.1 |
| Gardener viscosity | S | P-Q | S-T | V-W | R | O |

TABLE 4

| Example of preparation of material | 12 | 13 |
|---|---|---|
| compound (D) | D-1 | D-2 |
| xylene | 40.0 | 40.0 |
| component of dropped mixture, weight part | | |
| compound A-3(a) | 36.0 | — |
| compound A-2(a) | — | 19.5 |
| GMA | 14.2 | — |
| 2-hydroxyethyl methacrylate | — | 32.5 |
| BMA | 20.0 | 20.0 |
| MMA | 18.5 | 18.8 |
| EHA | 13.5 | 20.1 |
| TMSPMA | 16.6 | — |
| n-butyl acetate | 28.7 | 36.6 |
| AIBN | 4.5 | 4.5 |
| additional catalyst, weight part | | |
| n-butyl acetate | 7.6 | 7.6 |
| AIBN | 0.4 | 0.4 |
| properties | | |
| non-volatile matter, weight % | 58.5 | 55.3 |
| Gardener viscosity | V-W | Y-Z |

TABLE 5

| Example | 2(1) | 3(1) | 4(1) |
|---|---|---|---|
| composition of charged mixture, weight part | | | |
| Praccel E-488 ® | 387.6 | — | — |
| K-Flex 188-50 ® | — | 477.5 | — |
| Flexorez UD-320 ® | — | — | 321.0 |
| methylated hexahydrophthalic anhydride | 672.0 | — | — |
| hexahydrophthalic anhydride | — | 308.0 | 308.0 |
| methyl isobutyl ketone | 264.9 | 172.5 | 147.2 |

TABLE 6

| Example | 2(2) | 3(2) | 4(2) |
|---|---|---|---|
| composition of charged mixture, weight part | | | |
| solution of polycarboxyl compound of Example 2(1) | 330.1 | — | — |
| solution of polycarboxyl compound of Example 3(1) | — | 479.6 | — |
| solution of polycarboxyl compound of Example 4(1) | — | — | 387.0 |
| ethyl vinyl ether | 108.0 | — | — |
| isobutyl vinyl ether | — | 150.0 | 150.0 |
| monooctyl phosphate | 0.8 | 1.2 | 0.9 |
| xylene | 125.3 | 186.6 | 131.3 |
| removed solvent in vacuo, weight part | 36.0 | 50.0 | 50.0 |
| solution of thermal latent carboxyl compound | [2] | [3] | [4] |
| properties | | | |
| effective component, % | 50.1 | 49.8 | 50.0 |
| Gardener viscosity | J-K | G-H | I-J |

TABLE 7

| Example | 1 | 2 | 3 | 4 | 5 | 6 | 7 | 8 |
|---|---|---|---|---|---|---|---|---|
| properties of polycarboxyl compound | | | | | | | | |
| average number of functional group | 3 | 4 | 2 | 2 | 3 | 3 | 3 | 3.7 |
| acid equivalent, g/mole | 199 | 265 | 383 | 310 | 386 | 500 | 275 | 500 |
| number average molecular weight | 596 | 1060 | 766 | 621 | 1157 | 1500 | 825 | 1850 |
| blocking agent[1] | EVE | EVE | IBVE | IBVE | PVE | PVE | DHP | DHP |
| solution of thermal latent carboxyl compound | [1] | [2] | [3] | [4] | [5] | [6] | [7] | [8] |
| properties | | | | | | | | |
| effective component, weight % | 50.0 | 50.1 | 49.8 | 50.0 | 50.0 | 50.0 | 50.0 | 50.0 |

TABLE 7-continued

| Example | 1 | 2 | 3 | 4 | 5 | 6 | 7 | 8 |
|---|---|---|---|---|---|---|---|---|
| Gardener viscosity | F–G | J–K | G–H | I–J | J–K | L–M | S–T | O–P |

[1] EVE: ethyl vinyl ether
IBVE: isobutyl vinyl ether
PVE: n-propyl vinyl ether
DHP: 3,4-dihydro-2H-pyran

TABLE 8

| Example | 9 | 10 | 11 | 12 | 13 | 14 | 15 | 16 | 17 | 18 | 19 |
|---|---|---|---|---|---|---|---|---|---|---|---|
| compounding recipe in weight parts | | | | | | | | | | | |
| compound A-1 | 100 | — | — | — | 100 | — | — | — | — | — | — |
| compound A-2 | — | 100 | — | — | — | 100 | — | — | — | — | — |
| compound A-3 | — | — | 100 | — | — | — | 100 | 100 | 100 | — | — |
| compound A-4 | — | — | — | 50.0 | — | — | — | — | — | — | — |
| compound B-1 | — | — | — | 100 | — | — | 100 | — | — | — | — |
| compound B-2 | — | 100 | — | — | — | — | — | — | — | — | — |
| compound B-7 | — | — | — | — | — | — | — | — | 10.9 | — | — |
| compound D-1 | — | — | — | — | — | — | — | — | — | 100 | — |
| compound D-2 | — | — | — | — | — | — | — | — | — | — | 100 |
| EX-421 ® | 15.5 | — | — | — | — | — | — | — | — | — | — |
| PZ-33 ® | — | — | 16.1 | — | — | — | — | — | — | — | — |
| Coronate EH ® | — | — | — | — | 20.0 | — | — | — | — | — | — |
| Cymel 303 ® | — | — | — | — | — | 14.0 | — | — | — | — | 10.5 |
| KR-214 ® | — | — | — | — | — | — | — | 49.0 | — | — | — |
| titanium dioxide | 52.4 | 80.0 | 52.9 | 56.0 | 56.0 | 51.2 | 80.0 | 67.4 | 48.7 | 40.0 | 48.4 |
| Modaflow ® | 0.3 | 0.5 | 0.3 | 0.3 | 0.3 | 0.3 | 0.5 | 0.3 | 0.3 | 0.3 | 0.3 |
| 10% PTSA | — | — | — | — | — | 1.9 | — | — | 1.8 | — | 1.8 |
| 10% pyridine | — | — | — | — | — | 0.9 | — | — | 0.9 | — | 0.9 |
| xylene | 10 | 20 | 10 | 15 | 10 | 10 | 20 | 15 | 10 | 10 | 10 |
| n-butyl acetate | 2 | 4 | 2 | 3 | 2 | 2 | 4 | 3 | 2 | 2 | 2 |

TABLE 9

| Example | 9 | 10 | 11 | 12 | 13 | 14 |
|---|---|---|---|---|---|---|
| compound (A) | A-1 | A-2 | A-3 | A-4 | A-1 | A-2 |
| compound (B) | EX-421 epoxy group | B-2 alkoxysilane group | PZ-33 imino group | B-1 epoxy group | Coronate EH isocyanate group | Cymel 303 alkylated amino-methylol group |
| compound (D) | — | — | — | — | — | — |
| ratio of mixing solid components | | | | | | |
| (A) | 78.7 | 54.3 | 78.4 | 37.1 | 74.1 | 81.1 |
| (B) | 21.3 | 45.7 | 21.6 | 62.9 | 25.9 | 18.9 |
| (D) | — | — | — | — | — | — |
| storage stability at 50° C. | | | | | | |
| initial viscosity, poise | 1.0 | 1.0 | 1.0 | 1.0 | 1.0 | 1.0 |
| viscosity after 30 days, poise | 1.1 | 1.2 | 1.3 | 1.1 | 1.1 | 1.1 |
| curing condition | 120° C. 30 min | 140° C. 30 min | 120° C. 30 min | 140° C. 30 min | 120° C. 30 min | 140° C. 30 min | 120° C. 30 min | 140° C. 30 min | 120° C. 30 min | 140° C. 30 min | 120° C. 30 min | 140° C. 30 min |
| properties of coating[1] | | | | | | | | | | | | |
| resistance to acid 1 | good | good | good | good | good | good | good | good | good | good | good | good |
| resistance to acid 2 | stain | good | stain | good | stain | good | stain | good | stain | good | good | good |
| resistance to acid 3 | good | good | good | good | cloud | good | good | good | good | good | good | good |
| impact resistance | good | good | good | good | good | good | good | good | good | good | good | good |
| weathering resistance | 83% | 87% | 90% | 94% | 81% | 85% | 83% | 86% | 84% | 87% | 82% | 86% |
| Knoop hardness | 8.8 | 10.8 | 10.0 | 11.0 | 9.1 | 10.5 | 7.7 | 9.9 | 9.5 | 11.2 | 10.0 | 10.7 |

| Example | 15 | 16 | 17 | 18 | 19 |
|---|---|---|---|---|---|
| compound (A) | A-3 | A-3 | A-3 | — | — |
| compound (B) | B-1 epoxy group | KR-214 silanol group | B-7 acetal group | — | Cymel 303 alkylated amino-methylol group |
| compound (D) | — | — | — | D-1 epoxy group alkoxy silane group | D-2 hydroxyl group |
| ratio of mixing solid components | | | | | |
| (A) | 53.5 | 63.0 | 84.3 | — | — |
| (B) | 46.5 | 37.0 | 15.7 | — | 16.0 |
| (D) | — | — | — | 100 | 84.0 |
| storage stability at 50° C. | | | | | |

TABLE 9-continued

| | | | | | | | | | | |
|---|---|---|---|---|---|---|---|---|---|---|
| initial viscosity, poise | 1.0 | | 1.0 | | 1.0 | | 1.0 | | 1.0 | |
| viscosity after 30 days, poise | 1.1 | | 1.2 | | 1.1 | | 1.2 | | 1.2 | |
| curing condition | 120° C. 30 min | 140° C. 30 min | 120° C. 30 min | 140° C. 30 min | 120° C. 30 min | 140° C. 30 min | 120° C. 30 min | 140° C. 30 min | 120° C. 30 min | 140° C. 30 min |
| properties of coating[1)] | | | | | | | | | | |
| resistance to acid 1 | good | good | good | good | good | good | good | good | good | good |
| resistance to acid 2 | stain | good | stain | good | good | good | stain | good | good | good |
| resistance to acid 3 | good | good | cloud | good | good | good | good | good | good | good |
| impact resistance | good | good | good | good | good | good | good | good | good | good |
| weathering resistance | 81% | 85% | 88% | 93% | 84% | 88% | 82% | 87% | 81% | 85% |
| Knoop hardness | 8.2 | 10.4 | 8.7 | 11.5 | 10.7 | 11.1 | 9.5 | 11.3 | 10.2 | 10.8 |

[1)]good: no change was observed.
stain: slight stain was observed
cloud: surface was slightly cloudy

TABLE 10

| Comparative example | 1 | 2 |
|---|---|---|
| compounding recipe in weight parts | | |
| Compound A-5 | 100 | — |
| polycarboxylic acid A-4(a) | — | 33.3 |
| Denacol EX-421 | 15.5 | — |
| compound B-1 | — | 100 |
| titanium dioxide JR-602 | 52.4 | 56.0 |
| Modaflow | 0.3 | 0.3 |
| xylene | 10 | 10 |
| n-butyl acetate | 2 | 2 |

TABLE 11

| Comparative example | 1 | 2 |
|---|---|---|
| compound (A) | A-5 | polycarboxylic acid A-4(a) |
| compound (B) | EX-421 epoxy group | B-1 epoxy group |
| ratio of mixing solid components | | |
| (A) | 76.9 | 28.6 |
| (B) | 23.1 | 71.4 |
| storage stability at 50° C. | | |
| initial viscosity, poise | 1.0 | 1.0 |
| viscosity after 30 days, poise | 1.2 | gel after 5 days |
| curing condition | 140° C. 30 min | 140° C. 30 min |
| properties of coating[1)] | | |
| resistance to acid 1 | coating dissolved | good |
| resistance to acid 2 | coating dissolved | good |
| resistance to acid 3 | coating dissolved | good |
| impact resistance | coating broken by dropping of 10 cm | good |
| weathering resistance | chalking after 200 hours | 87% |
| Knoop hardness | 0.4 | 11.8 |

[1)]good: no change was observed.

TABLE 12

| Example | 20 | 21 | 22 | 23 |
|---|---|---|---|---|
| compounding recipe by weight parts | | | | |
| compound A-2 | 100 | — | — | — |
| compound A-4 | — | 50 | — | — |
| compound B-1 | — | 100 | — | — |
| compound B-2 | 100 | — | — | — |
| compound D-1 | — | — | 100 | — |
| compound D-2 | — | — | — | 100 |
| Cymel 303 | — | — | — | 10.5 |
| Modaflow | 0.2 | 0.1 | 0.1 | 0.1 |
| 10% PTSA | — | — | — | 1.8 |
| 10% pyridine | — | — | — | 1.9 |
| xylene | 5 | 4 | 3 | 3 |
| n-butyl acetate | 1 | 1 | 1 | 1 |

TABLE 13

| Example | 20 | 21 | 22 | 23 |
|---|---|---|---|---|
| compound (A) | A-2 | A-4 | — | — |
| compound (B) | B-2 alkoxysilane group | B-1 epoxy group | — | Cymel 303 alkylated aminomethylol group |
| compound (D) | — | — | D-1 epoxy group alkoxysilane group | D-2 hydroxyl group |
| ratio of mixing solid components | | | | |
| (A) | 54.3 | 37.1 | — | — |
| (B) | 45.7 | 62.9 | — | 16.0 |
| (D) | — | — | 100 | 84.0 |
| storage stability at 50° C. | | | | |
| initial viscosity, poise | 1.0 | 1.0 | 1.0 | 1.0 |
| viscosity after 30 days, poise | 1.2 | 1.2 | 1.2 | 1.2 |
| curing condition | 120° C. 30 min / 140° C. 30 min | 120° C. 30 min / 140° C. 30 min | 120° C. 30 min / 140° C. 30 min | 120° C. 30 min / 140° C. 30 min |
| properties of coating[1)] | | | | |
| resistance to acid 1 | good / good | good / good | good / good | good / good |
| resistance to acid 2 | stain / good | stain / good | stain / good | good / good |
| resistance to acid 3 | cloud / good | good / good | good / good | good / good |

TABLE 13-continued

| | | | | | | | | |
|---|---|---|---|---|---|---|---|---|
| impact resistance | good | good | good | good | good | good | good | good |
| weathering resistance | good | good | good | good | good | good | good | good |
| Knoop hardness | 8.8 | 10.9 | 9.0 | 11.2 | 8.1 | 10.3 | 10.8 | 11.5 |

[1]good: no change was observed.
stain: slight stain was observed
cloud: surface was slightly cloudy

TABLE 14

| Comparative example | 3 | 4 |
|---|---|---|
| compounding recipe by weight parts | | |
| compound A-5 | 100 | — |
| polycarboxylic acid A-4(a) | — | 33.3 |
| Denacol EX-421 | 15.5 | — |
| compound B-1 | — | 100 |
| Modaflow | 0.1 | 0.1 |
| xylene | 5 | 5 |
| n-butyl acetate | 1 | 1 |

TABLE 15

| Comparative example | 3 | 4 |
|---|---|---|
| compound (A) | A-5 | polycarboxylic acid A-4(a) |
| compound (B) | EX-421 epoxy group | B-1 epoxy group |
| ratio of mixing solid components | | |
| (A) | 76.9 | 28.6 |
| (B) | 23.1 | 71.4 |
| storage stability at 50° C. | | |
| initial viscosity, poise | 1.0 | 1.0 |
| viscosity after 30 days, poise | 1.2 | gel after 5 days |
| curing condition | 140° C. 30 min | 140° C. 30 min |
| properties of coating[1] | | |
| resistance to acid 1 | coating dissolved | good |
| resistance to acid 2 | coating dissolved | good |
| resistance to acid 3 | coating dissolved | good |
| impact resistance | coating broken by dropping of 10 cm | good |
| weathering resistance | cracking after 600 hours | good |
| Knoop hardness | 0.2 | 12.0 |

[1]good: no change was observed.

TABLE 16

| Example | 24 | 25 | 26 | 27 | 28 | 29 | 30 | 31 | 32 | 33 | 34 |
|---|---|---|---|---|---|---|---|---|---|---|---|
| compounding recipe by weight parts | | | | | | | | | | | |
| compound A-1 | 100 | — | — | — | 100 | — | — | — | — | — | — |
| compound A-2 | — | 100 | — | — | — | 100 | — | — | — | — | — |
| compound A-3 | — | — | 100 | — | — | — | 100 | 100 | 100 | — | — |
| compound A-4 | — | — | — | 50.0 | — | — | — | — | — | — | — |
| compound B-1 | — | — | — | 100 | — | — | 100 | — | — | — | — |
| compound B-2 | — | 100 | — | — | — | — | — | — | — | — | — |
| compound B-7 | — | — | — | — | — | — | — | — | 10.9 | — | — |
| compound D-1 | — | — | — | — | — | — | — | — | — | 100 | — |
| compound D-2 | — | — | — | — | — | — | — | — | — | — | 100 |
| EX-421 ® | 15.5 | — | — | — | — | — | — | — | — | — | — |
| PZ-33 ® | — | — | 16.1 | — | — | — | — | — | — | — | — |
| Coronate EH ® | — | — | — | — | 20.0 | — | — | — | — | — | — |
| Cymel 303 ® | — | — | — | — | — | 14.0 | — | — | — | — | 10.5 |
| KR-214 ® | — | — | — | — | — | — | — | 49.0 | — | — | — |
| titanium dioxide | 52.4 | 80.0 | 52.9 | 56.0 | 56.0 | 51.2 | 80.0 | 67.4 | 48.7 | 40.0 | 48.4 |
| Modaflow ® | 0.3 | 0.5 | 0.3 | 0.3 | 0.3 | 0.3 | 0.5 | 0.3 | 0.3 | 0.3 | 0.3 |
| 10% PTSA | — | — | — | — | — | 1.9 | — | — | 1.8 | — | 1.8 |
| 10% pyridine | — | — | — | — | — | 0.9 | — | — | 0.9 | — | 0.9 |
| C-1203 ® | 1.0 | — | — | — | — | — | — | — | — | — | — |
| acid catalyst A | — | 3.0 | — | — | — | — | — | 2.5 | — | 1.5 | — |
| acid catalyst B | — | — | 2.0 | — | — | — | — | — | — | — | — |
| acid catalyst C | — | — | — | 4.2 | 4.2 | — | — | — | — | — | — |
| acid catalyst D | — | — | — | — | — | — | 5.0 | — | — | — | — |
| xylene | 10 | 20 | 10 | 15 | 10 | 10 | 20 | 15 | 10 | 10 | 10 |
| n-butyl acetate | 2 | 4 | 2 | 3 | 2 | 2 | 4 | 3 | 2 | 2 | 2 |

TABLE 17

| Example | 24 | 25 | 26 | 27 | 28 | 29 |
|---|---|---|---|---|---|---|
| compound (A) | A-1 | A-2 | A-3 | A-4 | A-1 | A-2 |
| compound (B) | EX-421 epoxy group | B-2 alkoxysilane group | PZ-33 imino group | B-1 epoxy group | Coronate EH isocyanate group | Cymel 303 alkylated aminomethylol group |
| compound (D) | — | — | — | — | — | — |
| thermal latent catalyst (C) | Vesturit Catalyst 1203 | 1-methylethyl ester of PTSA | 1-methylheptyl ester of PTSA | 1-methylethyl ester of DDBSA[2] | 1-methylethyl ester of DDBSA | pyridine salt of PTSA |
| ratio of mixing solid components | | | | | | |
| (A) | 78.7 | 54.3 | 78.4 | 37.1 | 74.1 | 81.1 |
| (B) | 21.3 | 45.7 | 21.6 | 62.9 | 25.9 | 18.9 |
| (D) | — | — | — | — | — | — |
| content of (C), weight | 0.76 | 0.37 | 0.50 | 0.67 | 0.67 | 0.44 |

TABLE 17-continued

| | | | | | | | | | | | | |
|---|---|---|---|---|---|---|---|---|---|---|---|---|
| % = (C)/{(A) + (B) + (D)} × 100 storage stability at 50° C. | | | | | | | | | | | | |
| initial viscosity, poise | 1.0 | | 1.0 | | 1.0 | | 1.0 | | 1.0 | | 1.0 | |
| viscosity after 30 days, poise | 1.2 | | 1.3 | | 1.3 | | 1.2 | | 1.1 | | 1.1 | |
| curing condition | 120° C. 30 min | 140° C. 30 min | 120° C. 30 min | 140° C. 30 min | 120° C. 30 min | 140° C. 30 min | 120° C. 30 min | 140° C. 30 min | 120° C. 30 min | 140° C. 30 min | 120° C. 30 min | 140° C. 30 min |
| properties of coating[1)] | | | | | | | | | | | | |
| resistance to acid 1 | good | good | good | good | good | good | good | good | good | good | good | good |
| resistance to acid 2 | good | good | good | good | good | good | good | good | good | good | good | good |
| resistance to acid 3 | good | good | good | good | good | good | good | good | good | good | good | good |
| impact resistance | good | good | good | good | good | good | good | good | good | good | good | good |
| weathering resistance | 87% | 88% | 94% | 95% | 85% | 85% | 86% | 88% | 87% | 89% | 86% | 87% |
| Knoop hardness | 10.2 | 10.4 | 11.3 | 11.3 | 10.8 | 10.9 | 12.3 | 12.2 | 10.9 | 11.0 | 11.0 | 11.2 |

| Example | 30 | | 31 | | 32 | | 33 | | 34 | |
|---|---|---|---|---|---|---|---|---|---|---|
| compound (A) | A-3 | | A-3 | | A-3 | | — | | — | |
| compound (B) | B-1 epoxy group | | KR-214 silanol group | | B-7 acetal group | | — | | Cymel 303 alkylated aminomethylol group | |
| compound (D) | — | | — | | — | | D-1 epoxy group alkoxysilane group | | D-1 hydroxyl group | |
| thermal latent catalyst (C) | di-2-ethylhexyl phosphate | | 1-methylethyl ester of PTSA | | pyridine salt of PTSA | | 1-methylethyl ester of PTSA | | pyridine salt of PTSA | |
| ratio of mixing solid components | | | | | | | | | | |
| (A) | 53.5 | | 63.0 | | 84.3 | | — | | — | |
| (B) | 46.5 | | 37.0 | | 15.7 | | — | | 16.0 | |
| (D) | — | | — | | — | | 100 | | 84.0 | |
| content of (C), weight % = (C)/{(A) + (B) + (D)} × 100 | 0.50 | | 0.37 | | 0.44 | | 0.37 | | 0.44 | |
| storage stability at 50° C. | | | | | | | | | | |
| initial viscosity, poise | 1.0 | | 1.0 | | 1.0 | | 1.0 | | 1.0 | |
| viscosity after 30 days, poise | 1.2 | | 1.3 | | 1.1 | | 1.3 | | 1.2 | |
| curing condition | 120° C. 30 min | 140° C. 30 min | 120° C. 30 min | 140° C. 30 min | 120° C. 30 min | 140° C. 30 min | 120° C. 30 min | 140° C. 30 min | 120° C. 30 min | 140° C. 30 min |
| properties of coating[1)] | | | | | | | | | | |
| resistance to acid 1 | good | good | good | good | good | good | good | good | good | good |
| resistance to acid 2 | good | good | good | good | good | good | good | good | good | good |
| resistance to acid 3 | good | good | good | good | good | good | good | good | good | good |
| impact resistance | good | good | good | good | good | good | good | good | good | good |
| weathering resistance | 85% | 87% | 93% | 93% | 88% | 89% | 87% | 89% | 85% | 87% |
| Knoop hardness | 10.7 | 10.9 | 10.0 | 10.2 | 10.1 | 10.4 | 11.3 | 11.5 | 10.9 | 11.0 |

[1)] good: no change was observed

TABLE 18

| Comparative example | 5 |
|---|---|
| compounding recipe by weight parts | |
| polycarboxylic acid A-4 (a) | 33.3 |
| compound B-1 | 100 |
| titanium dioxide JR-602 | 56.0 |
| Modaflow | 0.3 |
| xylene | 10 |
| n-butyl acetate | 2 |
| acid catalyst A | 2.1 |

TABLE 19

| Comparative example | 5 |
|---|---|
| compound (A) | polycarboxylic acid A-4 (a) |
| compound (B) | B-1 epoxy group |
| thermal latent catalyst (C) | 1-methylethyl ester of PTSA |
| ratio of mixing solid components | |

TABLE 19-continued

| Comparative example | 5 |
|---|---|
| (A) | 28.6 |
| (B) | 71.4 |
| content of (C), weight % = (C)/{(A) + (B)} × 100 | 0.37 |
| storage stability at 50° C. | |
| initial viscosity, poise | 1.0 |
| viscosity after 30 days, poise | gel after 5 days |
| curing condition | 120° C. 30 min |
| properties of coating[1)] | |
| resistance to acid 1 | good |
| resistance to acid 2 | good |
| resistance to acid 3 | good |
| impact resistance | good |
| weathering resistance | 87% |
| Knoop hardness | 11.5 |

[1)] good: no change was observed.

TABLE 20

| Example | 35 | 36 | 37 | 38 | 39 | 40 | 41 |
|---|---|---|---|---|---|---|---|
| compounding recipe by weight parts | | | | | | | |
| compound A-2 | 100 | — | — | — | — | — | — |
| compound A-4 | — | 50 | — | — | 50 | 50 | 50 |
| compound B-1 | — | 100 | — | — | 100 | 100 | 100 |
| compound B-2 | 100 | — | — | — | — | — | — |
| compound D-1 | — | — | 100 | — | — | — | — |
| compound D-2 | — | — | — | 100 | — | — | — |
| Cymel 303 ® | — | — | — | 10.5 | — | — | — |
| Modaflow ® | 0.2 | 0.1 | 0.1 | 0.1 | 0.1 | 0.1 | 0.1 |
| 10% PTSA | — | — | — | 1.8 | — | — | — |
| 10% pyridine | — | — | — | 1.9 | — | — | — |
| xylene | 5 | 4 | 3 | 3 | 4 | 4 | 4 |
| n-butyl acetate | 1 | 1 | 1 | 1 | 1 | 1 | 1 |
| acid catalyst A | 3.0 | — | — | — | — | — | — |
| acid catalysy B | — | 2.4 | — | — | — | — | — |
| acid catalyst C | — | — | 1.5 | — | — | — | — |
| acid catalyst E | — | — | — | — | 4.0 | — | — |
| acid catalyst F | — | — | — | — | — | 3.2 | — |
| acid catalyst G | — | — | — | — | — | — | 8.0 |

TABLE 21

| Example | 35 | 36 | 37 | 38 |
|---|---|---|---|---|
| compound (A) | A-2 | A-4 | — | — |
| compound (B) | B-2 alkoxysilane group | B-1 epoxy group | — | Cymel 303 alkylated amino-methylol group |
| compound (D) | — | — | D-1 epoxy group alkoxysilane group | D-2 hydroxyl group |
| thermal latent catalyst (C) | 1-methylethyl ester of PTSA | 1-methylheptyl ester of PTSA | 1-methylethyl ester of DDBSA | pyridine salt of PTSA |
| ratio of mixing solid components | | | | |
| (A) | 54.3 | 37.1 | — | — |
| (B) | 45.7 | 62.9 | — | 16.0 |
| (D) | — | — | 100 | 84.0 |
| content of (C), weight % = (C)/{(A) + (B) + (D)} × 100 | 0.37 | 0.50 | 0.67 | 0.44 |
| storage stability at 50° C. | | | | |
| initial viscosity, poise | 1.0 | 1.0 | 1.0 | 1.0 |
| viscosity after 30 days, poise | 1.3 | 1.2 | 1.3 | 1.2 |
| curing condition | 120° C. 30 min / 140° C. 30 min | 120° C. 30 min / 140° C. 30 min | 120° C. 30 min / 140° C. 30 min | 120° C. 30 min / 140° C. 30 min |
| properties of coating[1)] | | | | |
| resistance to acid 1 | good  good | good  good | good  good | good  good |
| resistance to acid 2 | good  good | good  good | good  good | good  good |
| resistance to acid 3 | good  good | good  good | good  good | good  good |
| impact resistance | good  good | good  good | good  good | good  good |
| weathering resistance | good  good | good  good | good  good | good  good |
| Knoop hardness | 11.0  11.2 | 11.4  11.5 | 11.2  11.4 | 10.7  11.0 |

| Example | 39 | 40 | 41 |
|---|---|---|---|
| compound (A) | A-4 | A-4 | A-4 |
| compound (B) | B-1 epoxy group | B-1 epoxy group | B-1 epoxy group |
| compound (D) | — | — | — |
| thermal latent catalyst (C) | triethylamine salt of ZnCl$_2$ | 3-methyl-2-butynyltetramethylene sulfonium hexafluoro-antimonate | 4-methoxybenzyl-pyridinium hexafluoro-antimonate |
| ratio of mixing solid components | | | |
| (A) | 37.1 | 37.1 | 37.1 |
| (B) | 62.9 | 62.9 | 62.9 |
| (D) | — | — | — |
| content of (C), weight % = (C)/{(A) + (B) + (D)} × 100 | 0.50 | 2.00 | 2.00 |
| storage stability at 50° C. | | | |
| initial viscosity, poise | 1.0 | 1.0 | 1.0 |
| viscosity after 30 days, | 1.3 | 1.2 | 1.1 |

TABLE 21-continued

| poise | | | | | | |
|---|---|---|---|---|---|---|
| curing condition | 120° C. 30 min | 140° C. 30 min | 120° C. 30 min | 140° C. 30 min | 120° C. 30 min | 140° C. 30 min |
| properties of coating[1] | | | | | | |
| resistance to acid 1 | good | good | good | good | good | good |
| resistance to acid 2 | good | good | good | good | good | good |
| resistance to acid 3 | good | good | good | good | good | good |
| impact resistance | good | good | good | good | good | good |
| weathering resistance | good | good | good | good | good | good |
| Knoop hardness | 11.5 | 11.7 | 11.3 | 11.4 | 11.4 | 11.6 |

[1]good: no change was observed

TABLE 22

| Comparative example | 6 |
|---|---|
| compounding recipe by weight parts | |
| polycarboxylic acid A-4 (a) | 33.3 |
| compound B-1 | 100 |
| Modaflow | 0.1 |
| xylene | 5 |
| n-butyl acetate | 1 |
| acid catalyst A | 2.1 |

TABLE 23

| Comparative example | 6 |
|---|---|
| compound (A) | polycarboxylic acid A-4 (a) |
| compound (B) | B-1 epoxy group |
| thermal latent catalyst (C) | 1-methylethyl ester of PTSA |
| ratio of mixing solid components | |
| (A) | 28.6 |
| (B) | 71.4 |
| content of (C), weight % =(C)/{(A) + (B)} × 100 | 0.37 |
| storage stability at 50° C. | |
| initial viscosity, poise | 1.0 |
| viscosity after 30 days, poise | gel after 5 days |
| curing condition | 120° C. 30 min |
| properties of coating[1] | |
| resistance to acid 1 | good |
| resistance to acid 2 | good |
| resistance to acid 3 | good |
| impact resistance | good |
| weathering resistance | good |
| Knoop hardness | 11.4 |

[1]good: no change was observed

TABLE 24

| Example | 42 | 43 | 44 | 45 | 46 | 47 | 48 | 49 | 50 |
|---|---|---|---|---|---|---|---|---|---|
| compounding recipe of clear coating compositions by weight parts | | | | | | | | | |
| solution[1] [1] | 39.8 | — | — | — | — | — | — | — | 39.8 |
| solution[1] [2] | — | 53.0 | — | — | — | — | — | — | — |
| solution[1] [3] | — | — | 76.6 | — | — | — | — | — | — |
| solution[1] [4] | — | — | — | 62.0 | — | — | — | — | — |
| solution[1] [5] | — | — | — | — | 77.2 | — | — | — | — |
| solution[1] [6] | — | — | — | — | — | 100.0 | — | — | — |
| solution[1] [7] | — | — | — | — | — | — | 55.0 | — | — |
| solution[1] [8] | — | — | — | — | — | — | — | 100.0 | — |
| compound B-1 | 100.0 | — | — | — | — | — | 100.0 | — | 100.0 |
| compound B-2 | — | 100.0 | — | — | — | — | — | 100.0 | — |
| compound B-3 | — | — | 100.0 | — | — | — | — | — | — |
| compound B-4 | — | — | — | 200.0 | — | — | — | — | — |
| compound B-5 | — | — | — | — | 100.0 | — | — | — | — |
| compound B-6 | — | — | — | — | — | 100.0 | — | — | — |
| acid catalyst-B | 4.0 | 4.0 | 4.0 | 6.0 | 4.0 | 4.0 | 4.0 | 4.0 | — |
| acid catalyst-E | — | — | — | — | — | — | — | — | 3.5 |
| Modaflow | 0.3 | 0.3 | 0.3 | 0.3 | 0.3 | 0.4 | 0.3 | 0.4 | 0.3 |
| xylene | 10 | 10 | 10 | 10 | 10 | 10 | 10 | 10 | 10 |
| n-butyl acetate | 2 | 2 | 2 | 2 | 2 | 2 | 2 | 2 | 2 |

[1]solution of thermal latent polycarboxylic acid.

TABLE 25

| Example | 42 | 43 | 44 | 45 | 46 |
|---|---|---|---|---|---|
| thermal latent carboxyl compound | [1] | [2] | [3] | [4] | [5] |
| compound (B) | B-1 epoxy group | B-2 alkoxysilane group | B-3 imino group | B-4 alkylated amino-methylol group | B-5 isocyanate group |
| mixing ratio, mole/mole | 1/1 | 1/1 | 1/1 | 1/1 | 1/1 |
| thermal latent catalyst (C) | 1-methylheptyl ester of PTSA | 1-methylheptyl ester of PTSA | 1-methylheptyl ester of PTSA | 1-methylheptyl ester of PTSA | 1-methylheptyl ester of PTSA |
| storage stability at 50° C. | | | | | |
| initial viscosity, poise | 1.0 | 1.0 | 1.0 | 1.0 | 1.0 |
| viscosity after 30 days, | 1.2 | 1.3 | 1.1 | 1.2 | 1.1 |

TABLE 25-continued

| poise | | | | | | | | | | |
|---|---|---|---|---|---|---|---|---|---|---|
| curing condition | 120° C. 30 min | 140° C. 30 min | 120° C. 30 min | 140° C. 30 min | 120° C. 30 min | 140° C. 30 min | 120° C. 30 min | 140° C. 30 min | 120° C. 30 min | 140° C. 30 min |
| properties of coating[1] | | | | | | | | | | |
| resistance to acid 1 | good | good | good | good | good | good | good | good | good | good |
| resistance to acid 2 | good | good | good | good | good | good | good | good | good | good |
| resistance to acid 3 | good | good | good | good | good | good | good | good | good | good |
| impact resistance | good | good | good | good | good | good | good | good | good | good |
| weathering resistance | good | good | good | good | good | good | good | good | good | good |
| Knoop hardness | 10.8 | 11.0 | 11.1 | 11.2 | 10.7 | 10.9 | 11.4 | 11.8 | 10.9 | 11.3 |

| Example | | 47 | | 48 | | 49 | | 50 | |
|---|---|---|---|---|---|---|---|---|---|
| thermal latent carboxyl compound | | [6] | | [7] | | [8] | | [1] | |
| compound (B) | | B-6 vinyl ether group | | B-1 epoxy group | | B-2 alkoxysilane group | | B-1 epoxy group | |
| mixing ratio, mole/mole | | 1/1 | | 1/1 | | 1/1 | | 1/1 | |
| thermal latent catalyst (C) | | 1-methylheptyl ester of PTSA | | 1-methylheptyl ester of PTSA | | 1-methylheptyl ester of PTSA | | triethylamine salt of ZnCl$_2$ | |
| storage stability at 50° C. | | | | | | | | | |
| initial viscosity, poise | | 1.0 | | 1.0 | | 1.0 | | 1.0 | |
| viscosity after 30 days, poise | | 1.2 | | 1.3 | | 1.3 | | 1.3 | |
| curing condition | | 120° C. 30 min | 140° C. 30 min | 120° C. 30 min | 140° C. 30 min | 120° C. 30 min | 140° C. 30 min | 120° C. 30 min | 140° C. 30 min |
| properties of coating[1] | | | | | | | | | |
| resistance to acid 1 | | good | good | good | good | good | good | good | good |
| resistance to acid 2 | | good | good | good | good | good | good | good | good |
| resistance to acid 3 | | good | good | good | good | good | good | good | good |
| impact resistance | | good | good | good | good | good | good | good | good |
| weathering resistance | | good | good | good | good | good | good | good | good |
| Knoop hardness | | 11.2 | 11.5 | 10.5 | 10.8 | 10.9 | 11.3 | 10.9 | 11.1 |

[1] good: no change was observed.

TABLE 26

| Example | 51 | 52 | 53 |
|---|---|---|---|
| compounding recipe of clear coating by weight parts | | | |
| solution of thermal latent carboxyl compound [1] | 39.8 | 39.8 | 59.7 |
| compound B-8 | 100.0 | 100.0 | — |
| compound B-9 | — | — | 100.0 |
| Cymel 303 ® | 12.8 | — | — |
| Coronate 2513 ® | — | 20.6 | — |
| acid catalyst-B | 4.5 | 4.8 | 4.5 |
| Modaflow ® | 0.4 | 0.4 | 0.4 |
| xylene | 11 | 12 | 11 |
| n-butyl acetate | 2 | 3 | 2 |

TABLE 27

| Example | 51 | | 52 | | 53 | |
|---|---|---|---|---|---|---|
| thermal latent carboxyl compound | [1] | | [1] | | [1] | |
| compound (B) | B-8 epoxy group hydroxyl group | | B-8 epoxy group hydroxyl group | | B-9 epoxy group alkoxysilane group | |
| | Cymel 303 alkylated amino-methylol group | | Coronate 2513 blocked isocyanate group | | — | |
| thermal latent catalyst (C) | 1-methylheptyl ester of PTSA | | 1-methylheptyl ester of PTSA | | 1-methylheptyl ester of PTSA | |
| storage stability at 50° C. | | | | | | |
| initial viscosity, poise | 1.0 | | 1.0 | | 1.0 | |
| viscosity after 30 days, poise | 1.2 | | 1.1 | | 1.3 | |
| curing condition | 120° C. 30 min | 140° C. 30 min | 120° C. 30 min | 140° C. 30 min | 120° C. 30 min | 140° C. 30 min |
| properties of coating[1] | | | | | | |
| resistance to acid 1 | good | good | good | good | good | good |
| resistance to acid 2 | good | good | good | good | good | good |
| resistance to acid 3 | good | good | good | good | good | good |
| impact resistance | good | good | good | good | good | good |
| weathering resistance | good | good | good | good | good | good |
| Knoop hardness | 13.9 | 14.4 | 14.0 | 14.7 | 14.5 | 14.9 |

[1] good: no change was observed.

What is claimed is:

1. A thermosetting composition which comprises:
   (A) a compound having in the molecule two or more functional groups of the formula (1):

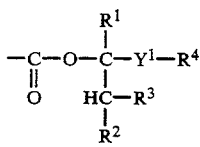

wherein $R^1$, $R^2$ and $R^3$ are respectively selected from the group consisting of a hydrogen atom and an organic group of 1 to 18 carbon atoms, $R^4$ is an organic group of 1 to 18 carbon atom, $Y^1$ is selected from the group consisting of an oxygen atom and a sulfur atom and $R^3$ and $R^4$ may be bonded with each other to form a heterocyclic structure which comprises $Y^1$ as the hetero atom component;
   (B) a compound having in the molecule two or more reactive functional groups which can form a chemical bond with the carboxyl functional groups which are generated from the compound (A) by heating; and, optionally,
   (C) a thermal latent acid catalyst which is activated during curing of the composition by heating.

2. A thermosetting composition as claimed in claim 1, wherein the reactive functional groups of the compound (B) are at least one kind selected from the group consisting of epoxy group, silanol group, alkoxysilane group, hydroxyl group, amino group, imino group, isocyanate group, blocked isocyanate group, cyclocarbonate group, vinyl ether group, vinyl thioether group, aminomethylol group, alkylated aminomethylol group, acetal group and ketal group.

3. Thermosetting composition as claimed in claim 1 or claim 2, wherein the thermal latent acid catalyst (C) is at least one kind selected from the group consisting of a compound prepared by neutralizing a protonic acid or a Lewis acid with a Lewis base, an ester of a sulfonic acid, an ester of phosphoric acid and an onium compound or a compound prepared by mixing a Lewis acid with trialkyl phosphate.

4. A thermosetting composition as claimed in claim 1 or claim 2, wherein the compound (A) and/or the compound (B) are polymers of $\alpha,\beta$-unsaturated compounds.

5. A thermosetting composition as claimed in claim 1 or claim 2, wherein the compound (A) and/or the compound (B) are polyester resins.

6. A thermosetting composition as claimed in claim 3, wherein the compound (A) and/or the compound (B) are polymers of $\alpha,\beta$-unsaturated compounds.

7. A thermosetting composition as claimed in claim 3, wherein the compound (A) and/or the compound (B) are polyester resins.

8. A thermosetting composition as claimed in claim 1, wherein an equivalent ratio of the functional groups of the compound (A) and the reactive functional groups of the compound (B) is 0.2:1.0 to 1.0:0.2.

9. A thermosetting composition as claimed in claim 1, wherein an amount of the thermal latent acid catalyst is 0.01 to 10 weight parts per 100 weight parts of the total solid component which contains the compound (A) and the compound (B).

10. A thermosetting composition as claimed in claim 8, wherein an amount of the thermal latent acid catalyst is 0.01 to 10 weight parts per 100 weight parts of the total solid component which contains the compound (A) and the compound (B).

11. A thermosetting composition as claimed in claim 1, 8 or 9 wherein the compound (A) has 2 to 50 functional groups of the formula (1) in the molecule.

12. A thermosetting composition as claimed in claim 1, 8 or 9 wherein the compound (B) has 2 to 50 reactive functional groups in the molecule.

13. A thermosetting composition as claimed in claim 1, 8 of 10 wherein the compound (A) is a thermal latent carboxyl compound prepared by a reaction of a polycarboxyl compound prepared by half esterification of a polyol having two or more hydroxyl groups in the molecule and an acid anhydride with a vinyl ether compound, whereby the carboxyl group is transformed into the functional group of the formula (1).

14. A thermosetting composition as claim 13, wherein the polycarboxyl compound has an acid equivalent of not more than 1000 g/mole and a number average molecular weight of not more than 4000.

15. A thermosetting composition as claimed in claim 14, wherein the number average molecular weight of the polycarboxyl compound is not more than 2000.

16. A thermosetting composition as claimed in claim 1, 8 or 10 wherein the compound (B) is a compound having two or more epoxy groups in the molecule.

17. A thermosetting composition as claimed in claim 16, wherein the compound (B) is a polymer of $\alpha,\beta$-unsaturated compound.

18. A thermosetting composition as claimed in claim 1, 8 or 10 wherein the thermal latent acid catalyst is a compound which exhibits an activity at a temperature above 60° C.

19. A thermosetting composition as claimed in claim 1, 8, 10 wherein the thermal latent acid catalyst is a compound prepared by neutralizing a Lewis acid and a Lewis base.

20. A thermosetting composition as claimed in claim 13, wherein the vinyl ether compound is an aliphatic vinyl ether compound having 3 to 10 carbon atoms.

21. A thermosetting composition as claimed in claim 13, wherein the vinyl ether compound is an aliphatic vinyl ether compound having 4 to 10 carbon atoms.

22. A thermosetting composition as claimed in claim 13, wherein the vinyl ether compound is methyl vinyl ether, ethyl vinyl ether, isopropyl vinyl ether, n-propyl vinyl ether, n-butyl vinyl ether, isobutyl vinyl ether, 2-ethylhexyl vinyl ether or cyclohexyl vinyl ether.

23. A thermosetting compound as claimed in claim 22, wherein the compound (B) is a compound having two or more epoxy groups in the molecule.

24. A thermosetting composition as claimed in claim 23, wherein the compound (B) is a polymer of an $\alpha,\beta$-unsaturated compound.

* * * * *